US008732113B2

(12) United States Patent
Huang et al.

(10) Patent No.: US 8,732,113 B2
(45) Date of Patent: May 20, 2014

(54) METHOD FOR QUANTIFYING AND MODELING DEGREE OF NONLINEARITY, COMBINED NONLINEARITY, AND NONSTATIONARITY

(75) Inventors: Norden Eh Huang, Bethesda, MD (US); Men-Tzung Lo, Tainan (TW); Zhao-Hua Wu, Jhongli (TW); Xian-Yao Chen, Jhongli (TW)

(73) Assignee: National Central University, Jhongli, Taoyuan County (TW)

( * ) Notice: Subject to any disclaimer, the term of this patent is extended or adjusted under 35 U.S.C. 154(b) by 248 days.

(21) Appl. No.: 13/241,565

(22) Filed: Sep. 23, 2011

(65) Prior Publication Data
US 2013/0080378 A1 Mar. 28, 2013

(51) Int. Cl.
*G06N 5/02* (2006.01)
*G06F 17/15* (2006.01)

(52) U.S. Cl.
USPC ............................................ 706/54; 708/426

(58) Field of Classification Search
None
See application file for complete search history.

(56) References Cited

U.S. PATENT DOCUMENTS

| 5,983,162 | A | 11/1999 | Huang |
| 6,252,668 | B1 | 6/2001 | Hill |
| 6,311,130 | B1 | 10/2001 | Huang |
| 6,381,559 | B1 | 4/2002 | Huang |
| 6,631,325 | B1 | 10/2003 | Huang et al. |
| 6,738,734 | B1 | 5/2004 | Huang |
| 6,819,412 | B2 | 11/2004 | Glingener et al. |
| 6,862,558 | B2 | 3/2005 | Huang |
| 6,901,353 | B1 | 5/2005 | Huang |
| 6,990,436 | B1 | 1/2006 | Huang |
| 2010/0075620 | A1 | 3/2010 | Subburaj et al. |

FOREIGN PATENT DOCUMENTS

TW 200620859 6/2006

OTHER PUBLICATIONS

Magrin-Chagnolleau, Baraniuk, "Empirical Mode Decomposition Based Time-frequency Attributes", Society of Exploration Geophysicists, seg.org, published in 1999 SEG Annual Meeting, Oct. 31-Nov. 5, 1999, Houston, Texas, 1999, pp. 1-4.*
Chen, Mandic, Kidmose, Ungstrup, "Qualitative Assessment of Intrinsic Mode Functions of Empirical Mode Decomposition", Acoustics, Speech and Signal Processing, 2008. ICASSP 2008. IEEE International Conference on, Mar. 31, 2008-Apr. 4, 2008, pp. 1905-1908.*
A. H. Nuttall, "On the quadrature approximation to the Hilbert transform of modulated signals", Proc. IEEE 54 (1966), pp. 1458-1459.*
E. Bedrosian, "A Product Theorem for Hilbert Transform's", Proc. IEEE 51 (1963), pp. 868-869.*
English translation of abstract of TW 200620859.

* cited by examiner

*Primary Examiner* — Kakali Chaki
*Assistant Examiner* — Walter Hanchak
(74) *Attorney, Agent, or Firm* — McClure, Qualey & Rodack, LLP

(57) ABSTRACT

A degree of nonlinearity based on intra-wave frequency modulation is proposed here with the value substantially between 0 and 1. The degree of nonlinearity is used for obtaining the state rather than a system. The data required for defining the degree of nonlinearity is the state of the motion or the observed data. For a complicate state with more than one IMF containing prominent energy density, the degree of nonlinearity has also considered the amplitude variations. The combination of the intra-wave frequency modulation and the amplitude variation gives the Combined Degree of nonlinearity. With the definitions of degree of nonlinearity, the nonlinearity characteristic can be quantified, and the discussion of nonlinear effects could be conducted more precisely.

25 Claims, 32 Drawing Sheets

METHOD FOR QUANTIFYING AND MODELING DEGREE OF NONLINEARITY, COMBINED NONLINEARITY, AND NONSTATIONARITY

BACKGROUND

1. Field of Invention

The present invention relates to the degree of nonlinearity. More particularly, the present invention relates to quantifying the degree of nonlinearity.

2. Description of Related Art

The term 'nonlinearity' has been loosely used, in most cases, not to clarify but as a fig leaf to hide our ignorance. As a result, any anomaly without obvious and ready explanations is labeled as "nonlinear effect". Such an approach could certainly be right for some cases, but, at the best, the answer is is not complete, for the nonlinear effects could have many causes: For example, nonlinear effects could be the results of the intrinsic properties of the system and also arise from the various initial conditions. Unfortunately, under the present state of our understanding, no better solution is available. The central of the problem is that the definition of 'nonlinearity' is only qualitative. Let us review the definition of nonlinearity.

Currently the nonlinearity is defined based a system point of view. And the definition is not directly on nonlinearity, but on linearity; any system that is not linear would be nonlinear. The linearity is based on linear algebra: For any system L is linear, if for inputs x1 and x2 we have outputs y1 and y2 respectively as:

$$L(x_1)=y_1;$$

$$L(x_2)=y_2; \quad (1)$$

We should also have $$L(\alpha x_1+\beta x_2)=\alpha y_1+\beta y_2 \quad (2)$$

Any system does not satisfy this superposition and scaling rules given in Equation (1) and (2) is a nonlinear system. This definition is rigorous but qualitative, for the answer offer is 'yes' or 'no' without any quantitative measure. Furthermore, this system approach may not be very practical. For many phenomena, it might be difficult, if not impossible, to define the system in close form to test this input vs. out put approach. For example, many natural systems are so complicated that a closed system is hard to define. Even for those systems that we could find explicit analytic expression in closed form, the inputs and out puts could still be hard to define. For example, for the autonomous system, the state of the phenomena depends totally on the initial condition, which is hardly qualified as inputs. The motion or the flow of the system is also hard to be treated as output. Furthermore, for complicate system, there might not be a small parameter for us to track the progress of the system from linear to nonlinear as that parameter changes. All of these difficulties made the discussions of nonlinearity hard to quantify. Without quantification, however, it would be impossible to discuss the nonlinearity more precise and prevent its loose usage. A brief review of the state-of-the-arts nonlinearity tests is given first.

A Brief Review of the State-of-the-arts in Nonlinearity Tests

Even though the definition of nonlinearity used now is qualitative, to be able to determine whether a given set of data is or is not coming from a nonlinear process s still a highly desirable. Many tests have been proposed and used, most frequently in financial data (see, for example, Kantz and Schreiber, 1997 and Tsay, 2005); they all have some deficiencies. The current available nonlinearity teat is briefly summarized here:

a. Tests Based on Inputs and Outputs

As discussed above, the inputs and outputs are hard to define for most cases. There are, however, special occasions when this is possible in a closed system as in some engineering applications. Methods to identify the nonlinearity could be based on the inputs and outputs data. In principle, this is a much easier problem. This approach is best summarized by Bendat (1990). The main tools employed were the probability distribution functions and higher order Fourier spectral analysis. In theory, the approach would be possible, for the probability distribution changes from inputs to outputs could be well defined through the generalized theorem of probability, which states that known the distribution of a random variable, one could derive the distribution of any function of that variable. Either probability or the spectral approach all depends on the stationary assumption. Furthermore, when the processes are nonlinear, the Fourier spectral analysis could also generate spurious harmonics. Finally, the best result this approach could provide is still limited to qualitative ones. When the closed system is not available as is the rule rather than exception, this approach is totally infeasible. Therefore, we have to study the cases when only outputs data is available.

b. Tests Totally Based on Data.

One of the oldest nonlinearity test is the purely data based method of higher order spectral analysis (Nikias and Petropulu, 1993). The idea is to use cumulant spectra, such as the bispectra and the trispectra. There are two major problems for this approach: First, the cumulant spectra do not measure nonlinearity directly; they actually measure the departure from normalcy. For example, the total integration of a bispectrum gives the skewness and the integration of tri-spectrum, the kurtosis. Granted that linear processes are mostly Gaussian by virtue of the central limit theorem, but nonlinear process could also produce data with Gaussian distribution. The obvious case is the homogeneous turbulence, a phenomenon of the fluid motion produced through the instability of nonlinear flows and highly interactive cascade of eddies (Batchelor, 1953; Frisch, 1995), yet the distribution of its velocity is normal. Secondly, the computation employs the Fourier transform, which is under the assumption of stationarity. This will strongly restrict the applicability of the test and weaken its test results.

c. Nonparametric Tests

In this approach, all the tests are based on the hypothesis that the data from linear processes should have near linear residue from a properly defined linear model. Famous among the tests are the ones proposed by McLeod and Li (1983), where ARMA (p,q) model is used; Brock, Dechert and Scheikman (BDS, 1987), where 'correlation integral' is used to test the iid (independent, identical distribution) of the data distribution; and Theiler et al (1992), where an ensemble of linear surrogate sets of data is set up based on a null hypothesis then compare with the given data. Here, the BDS test is not designed for nonlinearity at all; it is for testing of whether the data is stochastic or chaotic. Theiler's tests depend on the null hypothesis and the ensemble of models so established. The ensemble could be extensive, but hardly exhaustive. All the tests are again qualitative: simply determining the process is or is not linear.

d. Parametric Tests

The parametric approach is based on a given model, such as auto-regression model. Ramsey (1969) first proposed a test for linear least square regression analysis. Although later generalization by Keenan (1985) and Tsay (1986) using different regressors, the test is limited to specific model.

For more detailed discussion, one should consult the original paper, or see Kantz and Schreiber (1997) and Tsay (2005).

Critical shortcomings of all the tests are that most of the tests are limited to stationary processes, and also that all the answers are still qualitative in nature. Few problems could be answered satisfactorily with a qualitative answer. If nonlinearity is an issue, quantitative answer is imperative.

SUMMARY

According to one embodiment of the present invention, a method implemented by an electronic system for obtaining and modeling a degree of nonlinearity of a target signal is disclosed. The method decomposes the target signal into at least one intrinsic mode function with Empirical Mode Decomposition and obtains an instantaneous frequency of the intrinsic mode function with a direct quadrature method. The method also obtains a mean frequency of the intrinsic mode function within a cycle using a modified generalized zero-crossing method and acquires a frequency difference between the instantaneous frequency and the mean frequency. After that, the method derives a degree of nonlinearity of the target signal according to the frequency difference and the mean frequency and presents the degree of nonlinearity to a human being.

According to another embodiment of the present invention, a method implemented by an electronic system for obtaining and modeling a combined degree of nonlinearity of a target signal is disclosed. The method decomposes the target signal into a plurality of intrinsic mode function with Empirical Mode Decomposition and obtains an instantaneous frequency of each intrinsic mode is function with a direct quadrature method. The method also obtains a mean frequency of each intrinsic mode function within a cycle using a modified generalized zero-crossing method and acquires a plurality of frequency difference between the instantaneous frequencies and the mean frequencies. After that, the method derives a plurality of degree of nonlinearity according to the frequency differences and the mean frequencies and obtains a combined degree of nonlinearity by weighting the degree of nonlinearity with corresponding energies. Then, the method presents the combined degree of nonlinearity to a human being.

According to the other embodiment of the present invention, a method implemented by an electronic system for obtaining and modeling a degree of nonlinearity of a non-stationary target signal is disclosed. The method decomposes the non-stationary target signal into at least one intrinsic mode function within a time window and obtains an instantaneous frequency of the intrinsic mode function as well as a mean frequency of the intrinsic mode function. After that, the method acquires a frequency difference between the instantaneous frequency and the mean frequency, derives a degree of nonlinearity of the non-stationary target signal according to the frequency difference and the mean frequency, and presents the degree of nonlinearity to a human being.

According to the other embodiment of the present invention, a method for quantifying and modeling a degree of nonstationarity is disclosed. The method, implemented by an electronic system, obtains an instantaneous Hilbert spectrum, obtains a mean Hilbert spectrum corresponding to a time window, derives a normalization according to the instantaneous Hilbert spectrum and the mean Hilbert spectrum, derive a deviation from the normalization, obtains a degree of nonstationarity corresponding to the deviation, and presents the a degree of nonstationarity to a human being.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

Figure 4A:
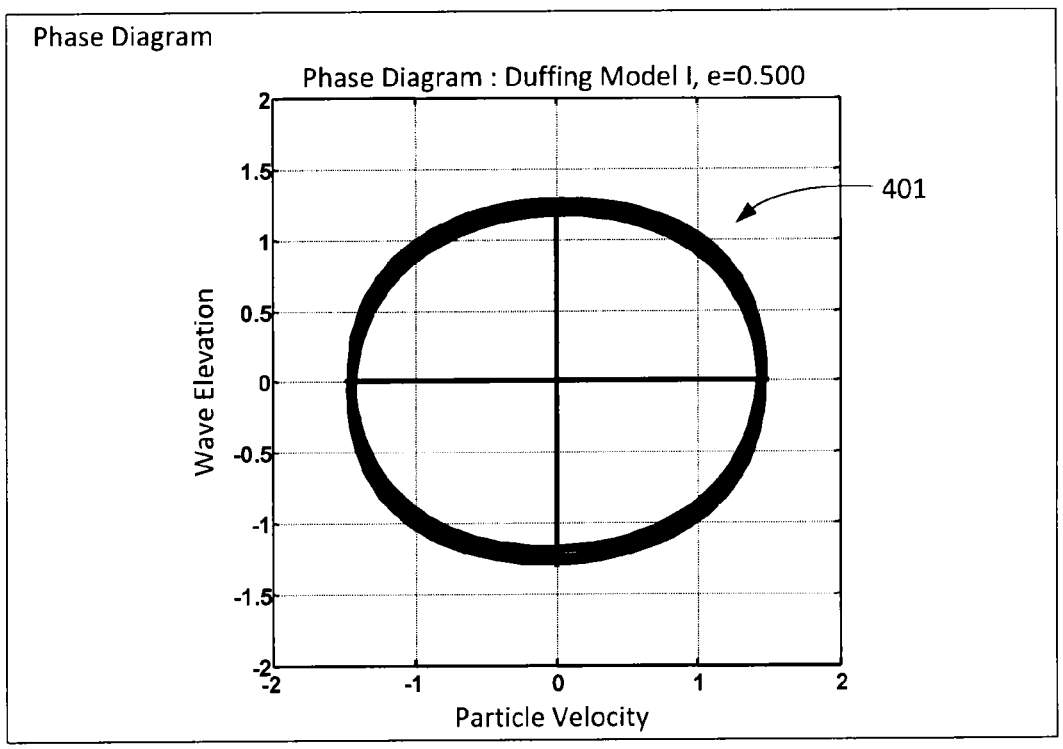
Figure 4B:
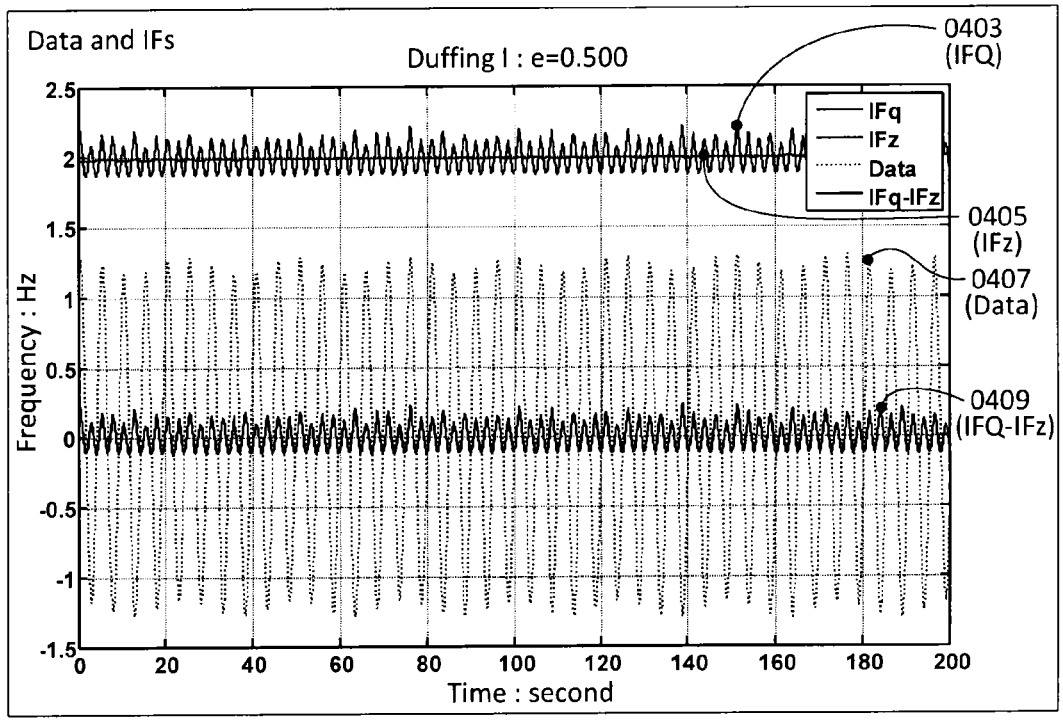
Figure 4C:
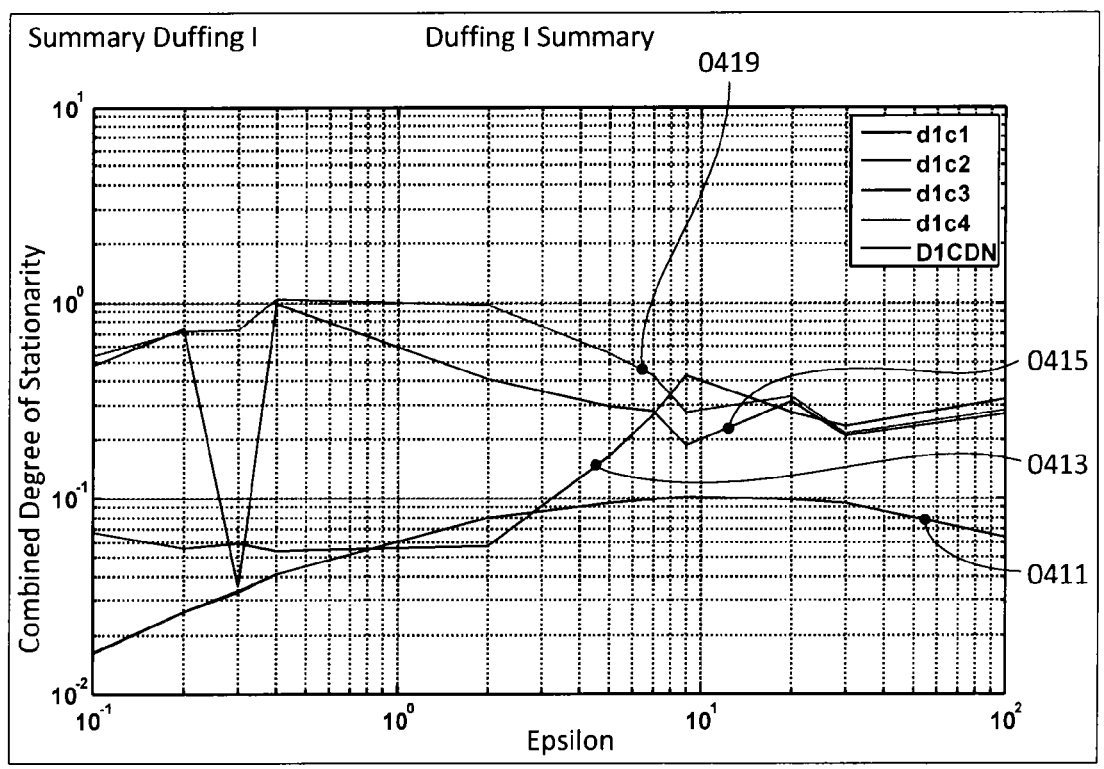
Figure 5A:
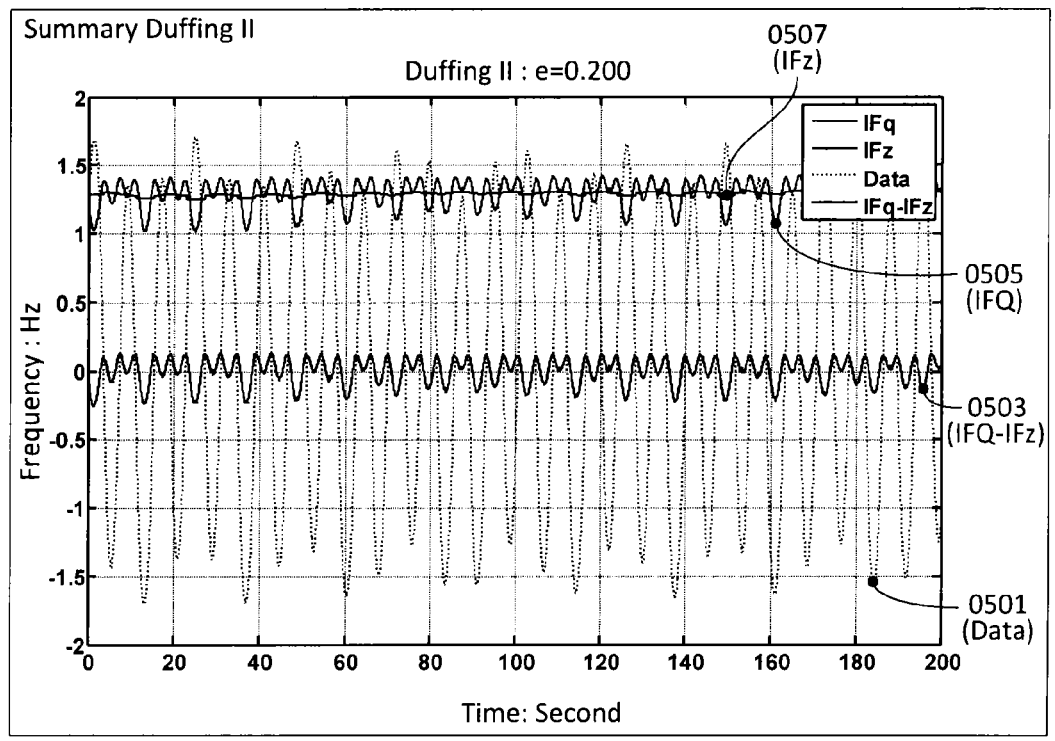
Figure 5B:
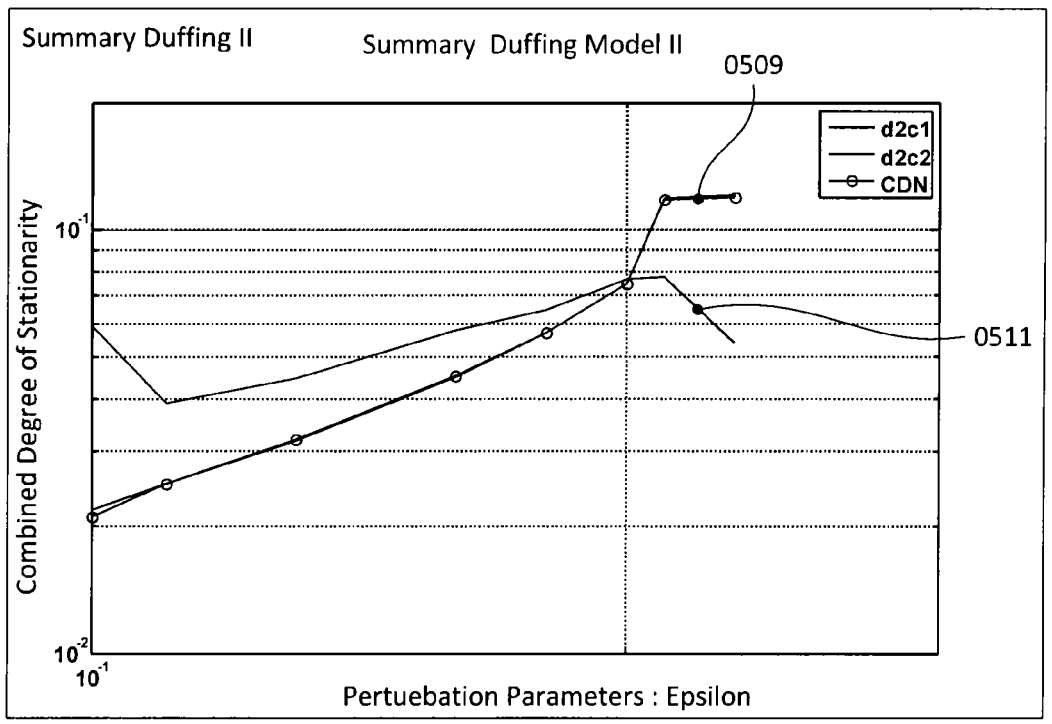
Figure 6A:
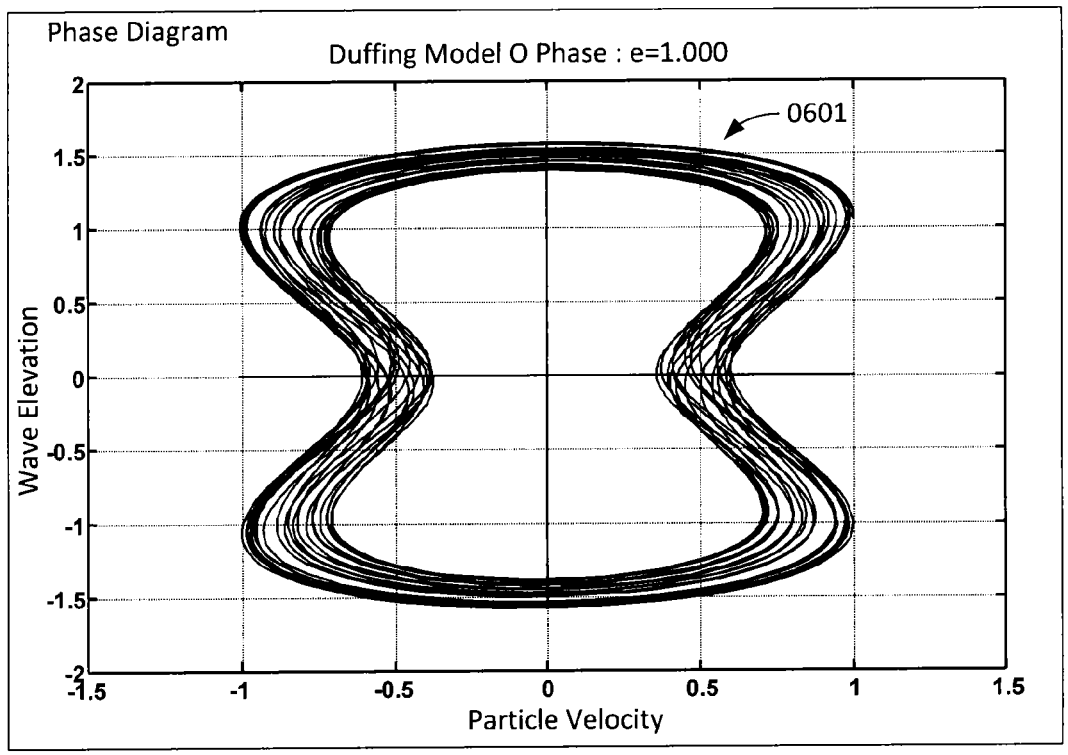
Figure 6B:
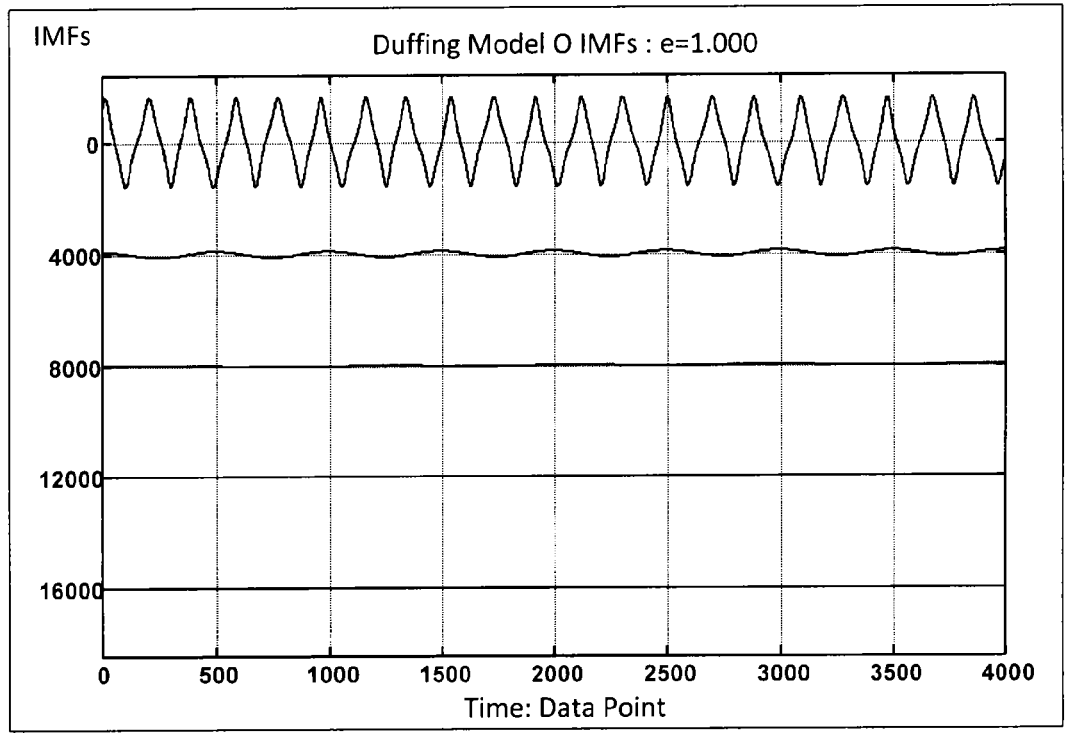
Figure 6C:
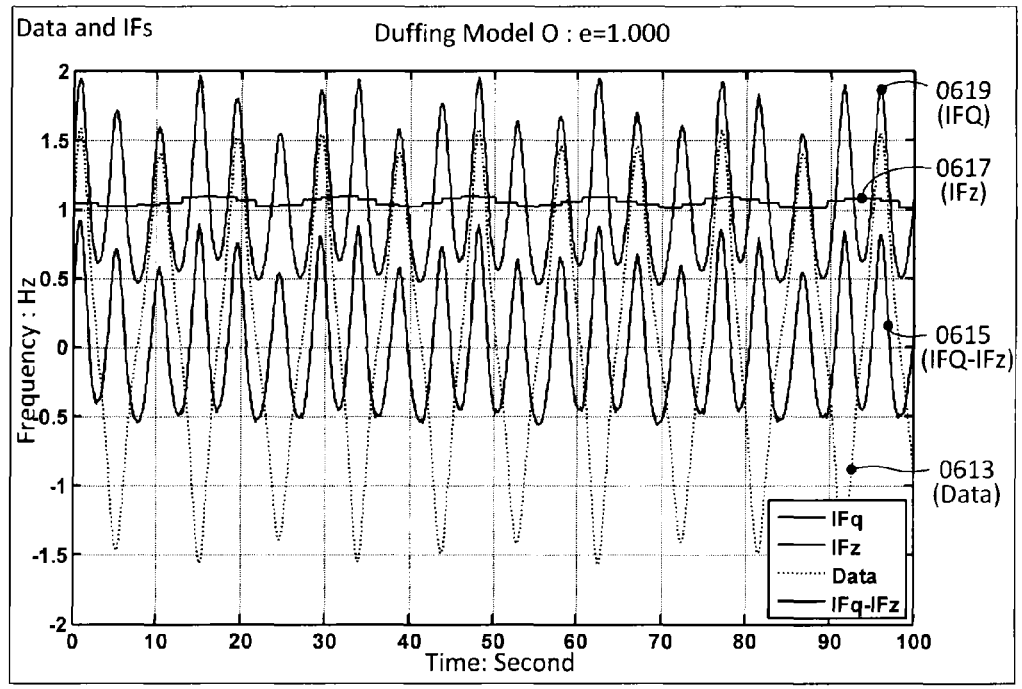
Figure 6D:
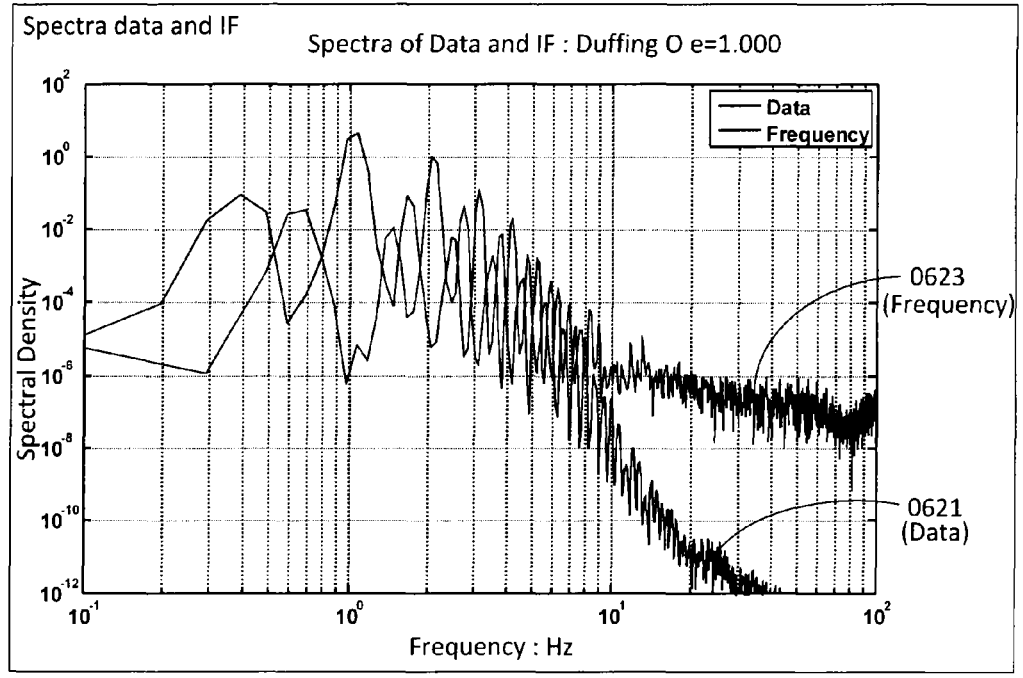
Figure 7A:
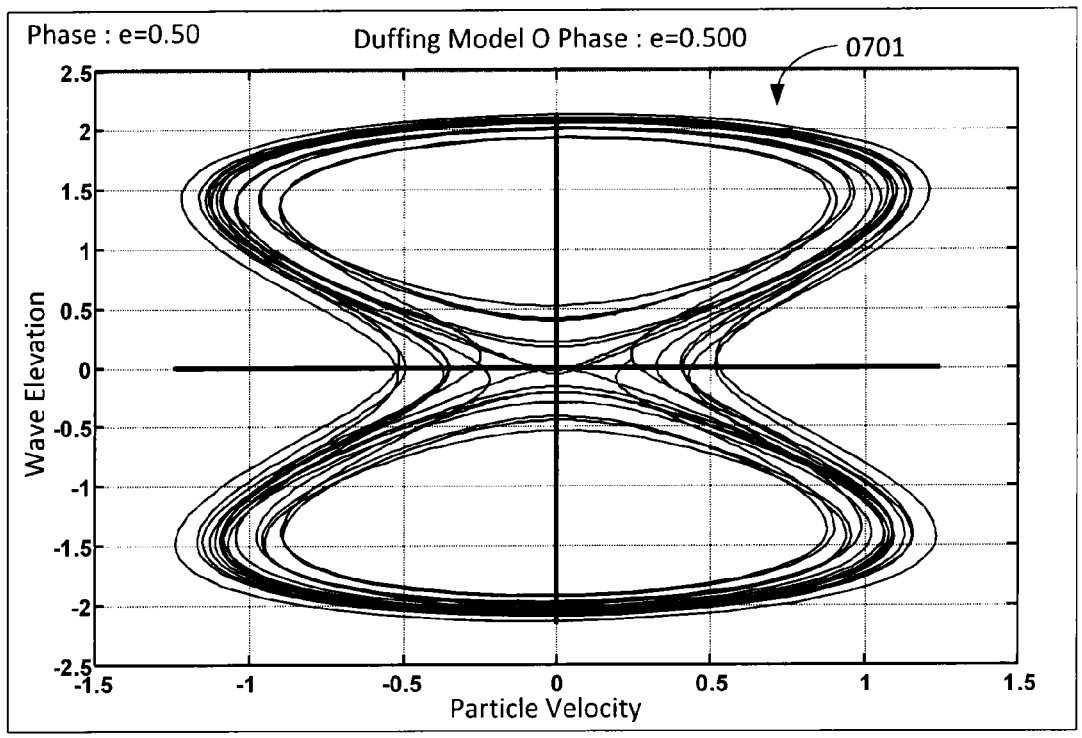
Figure 7B:
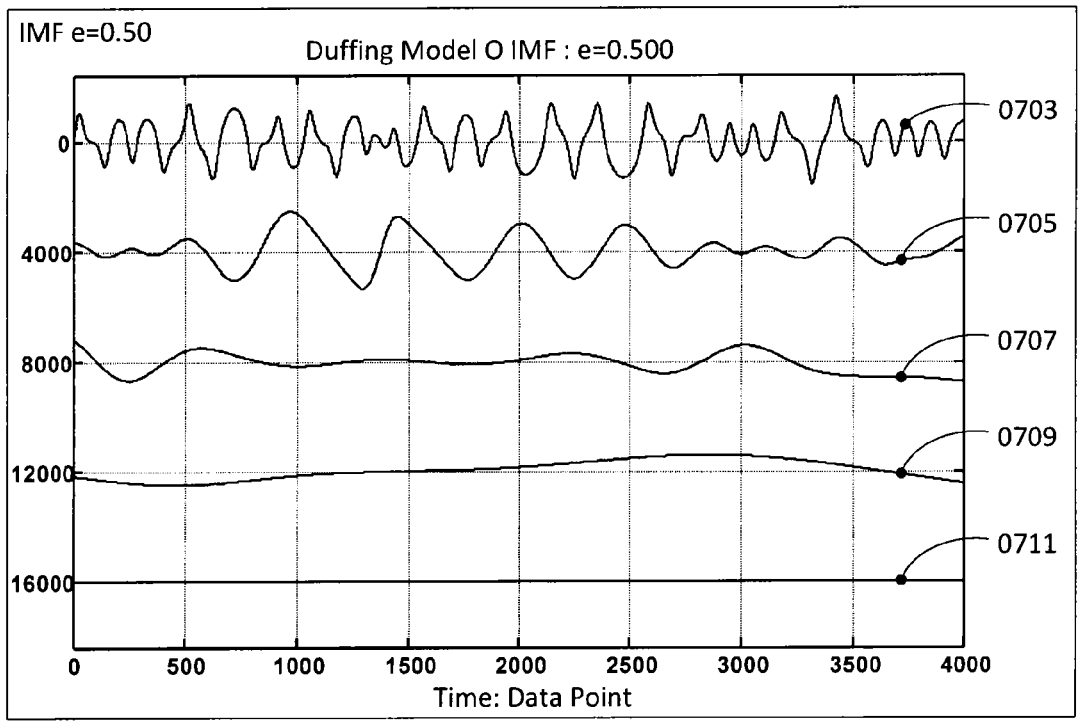
Figure 7C:
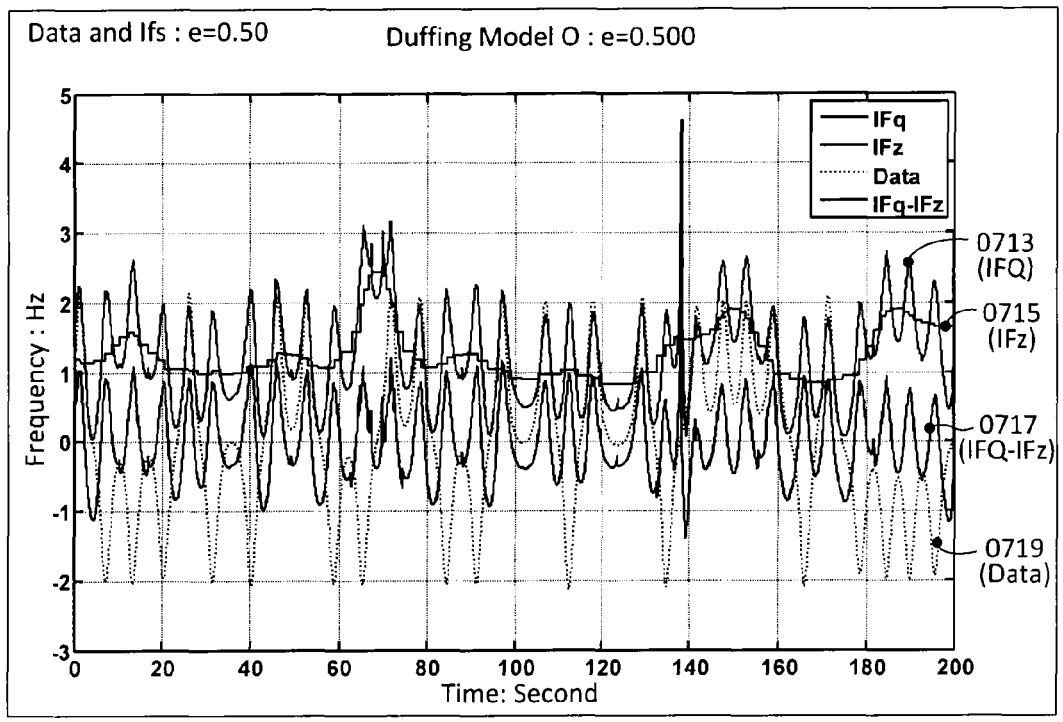
Figure 7D:
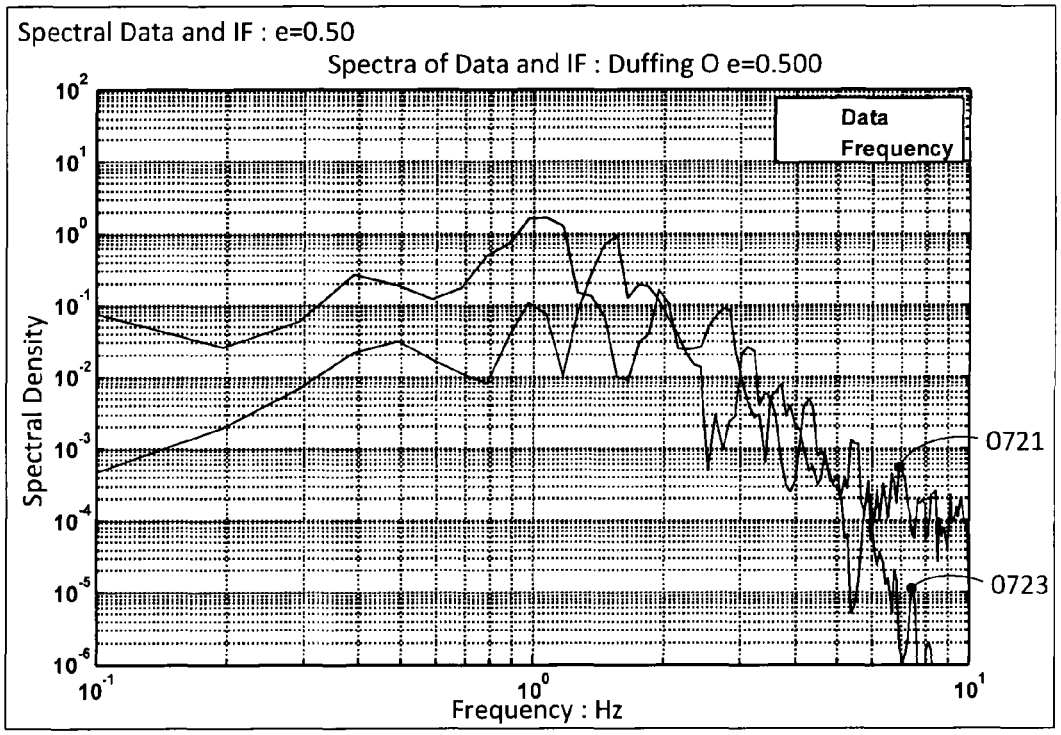
Figure 8:
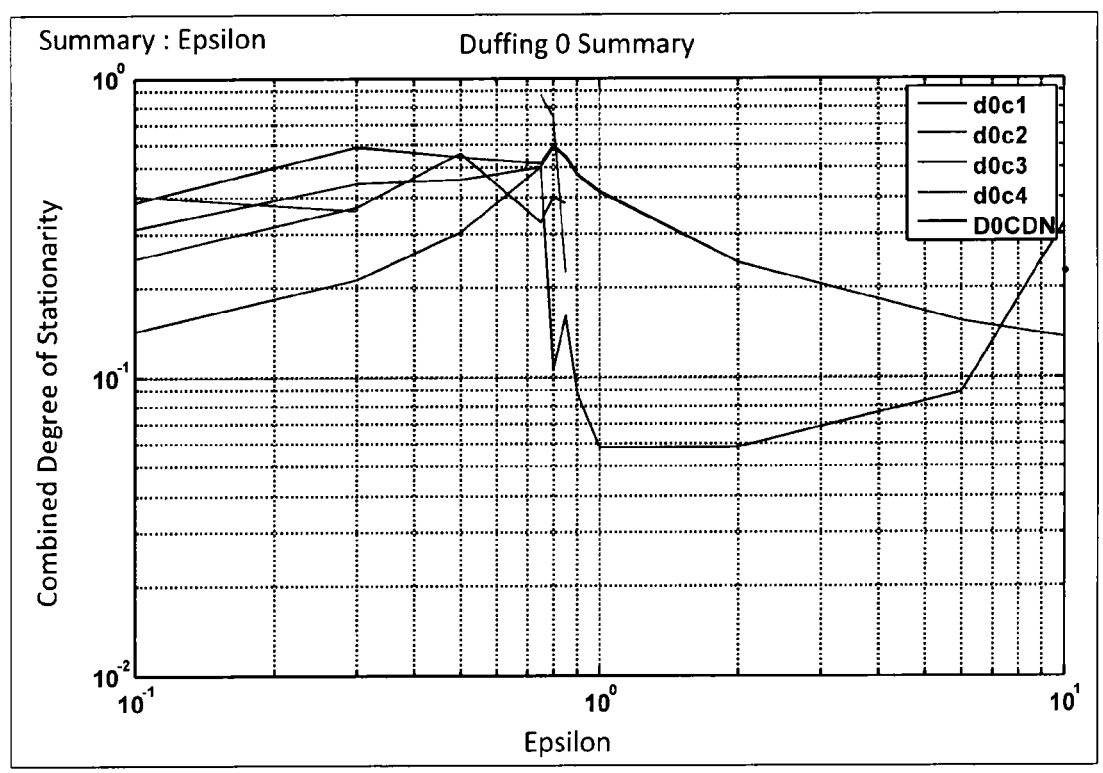
Figure 9A:
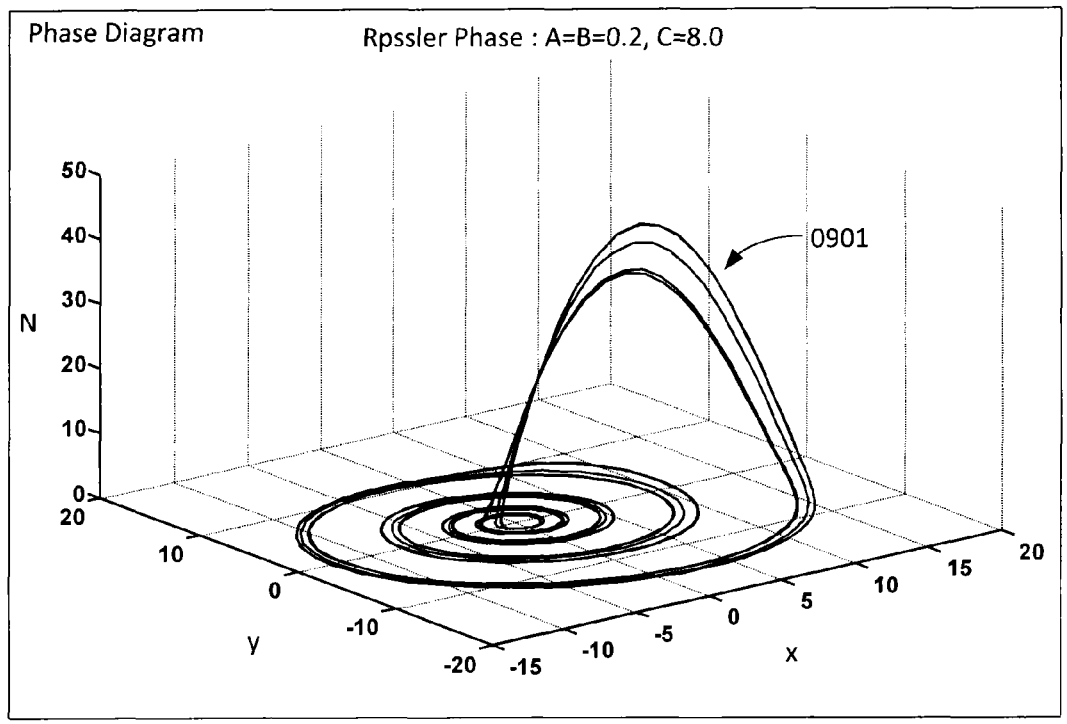
Figure 9B:
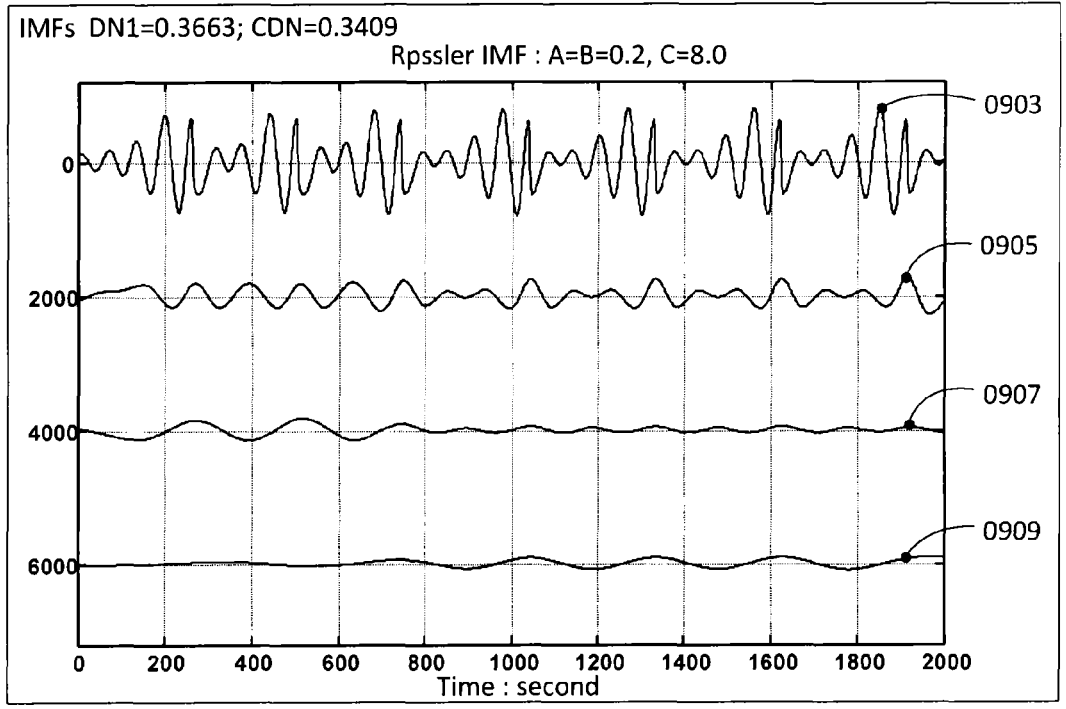
Figure 9C:
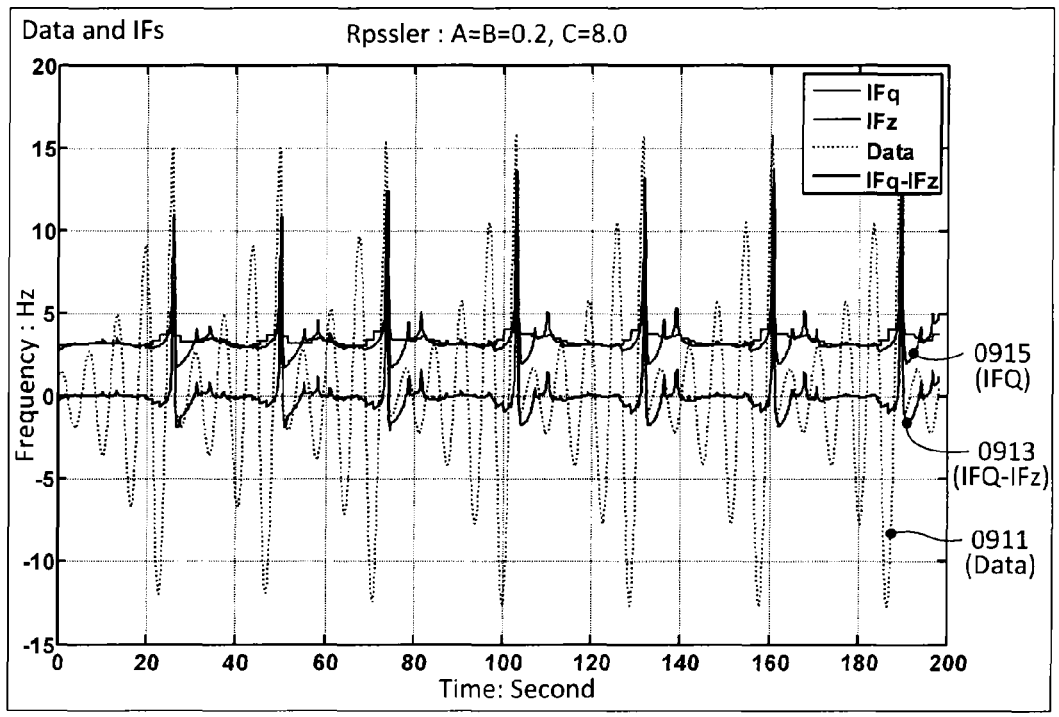
Figure 9D:
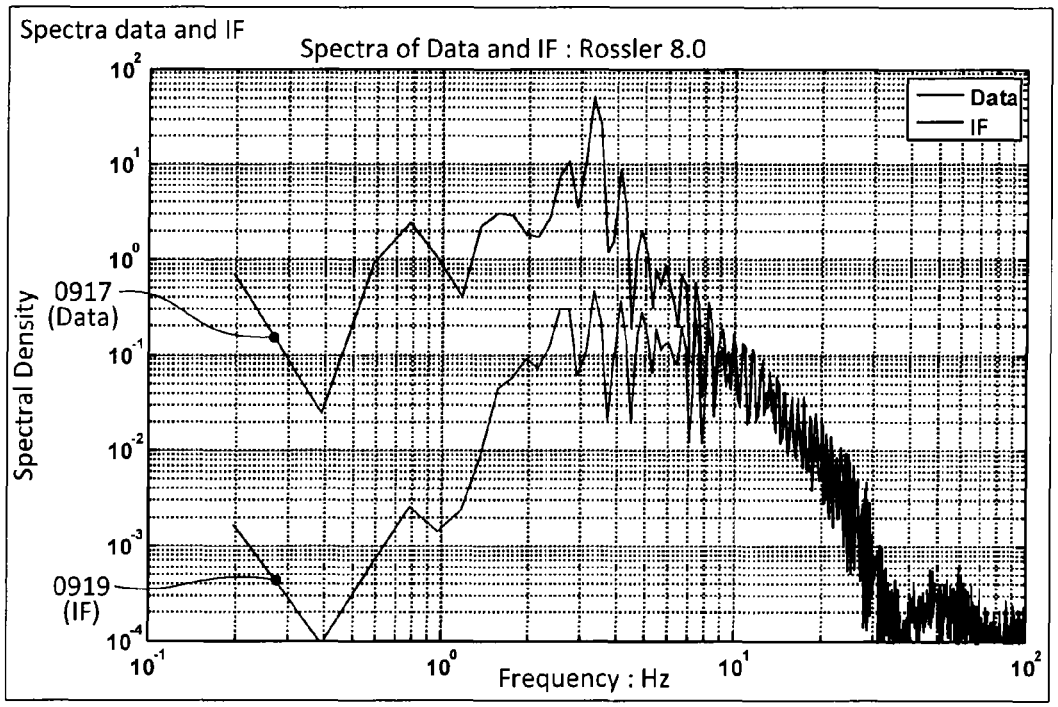
Figure 10:
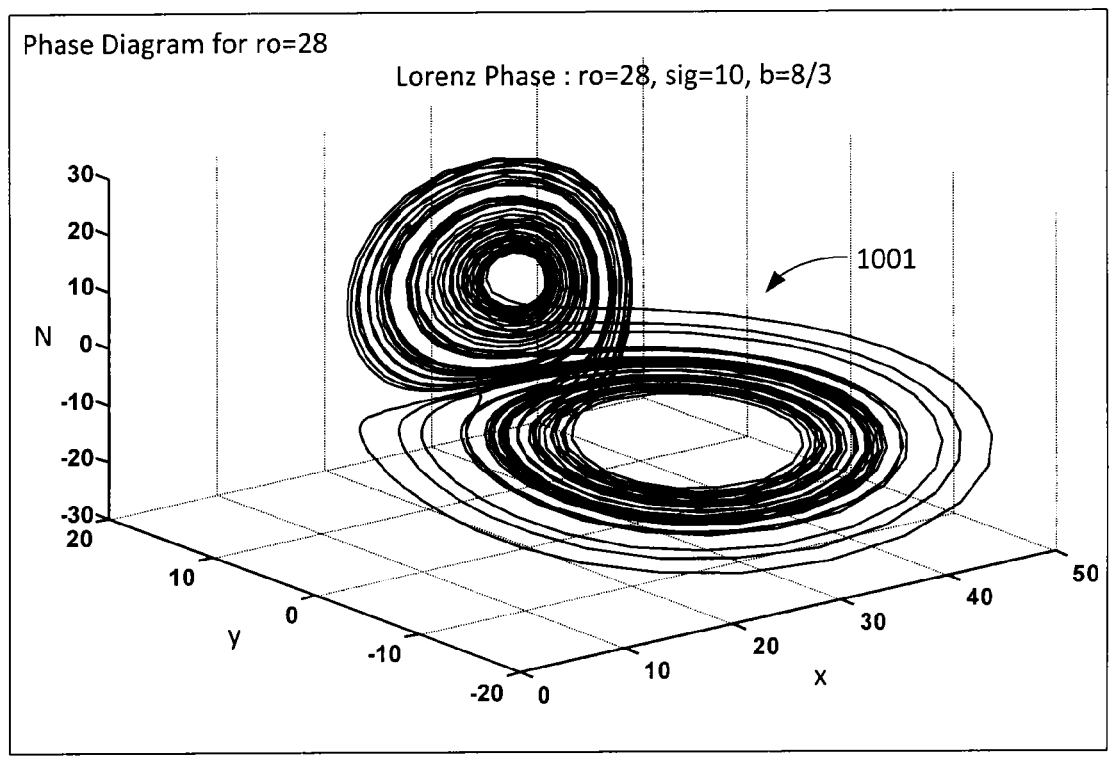
Figure 11A:
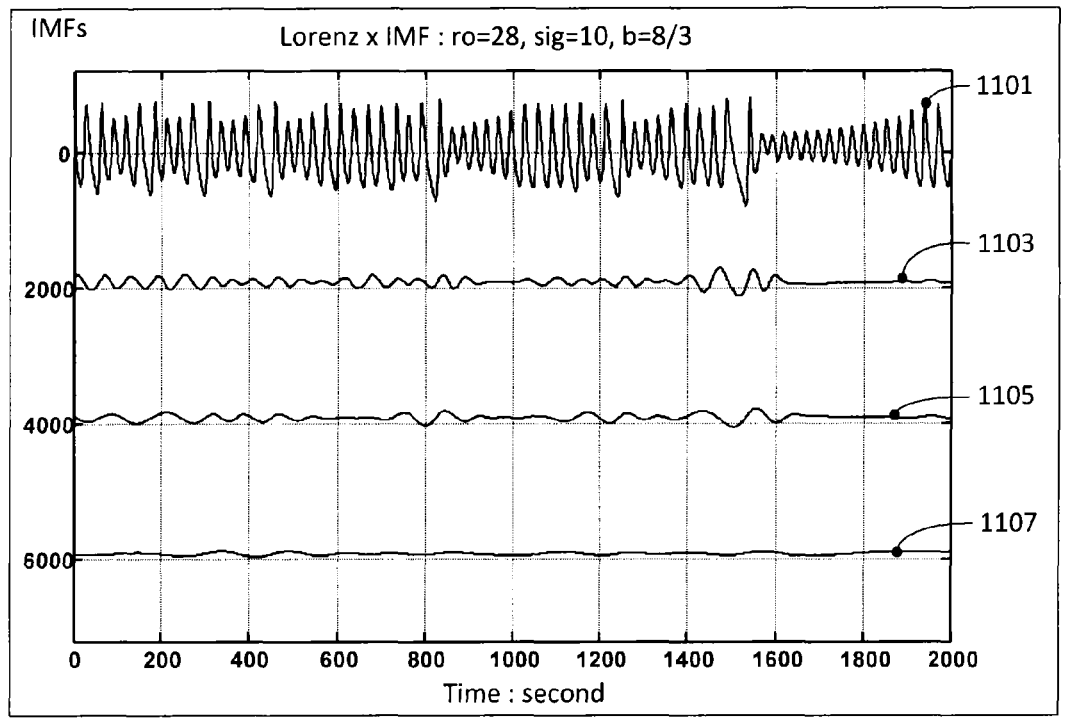
Figure 11B:
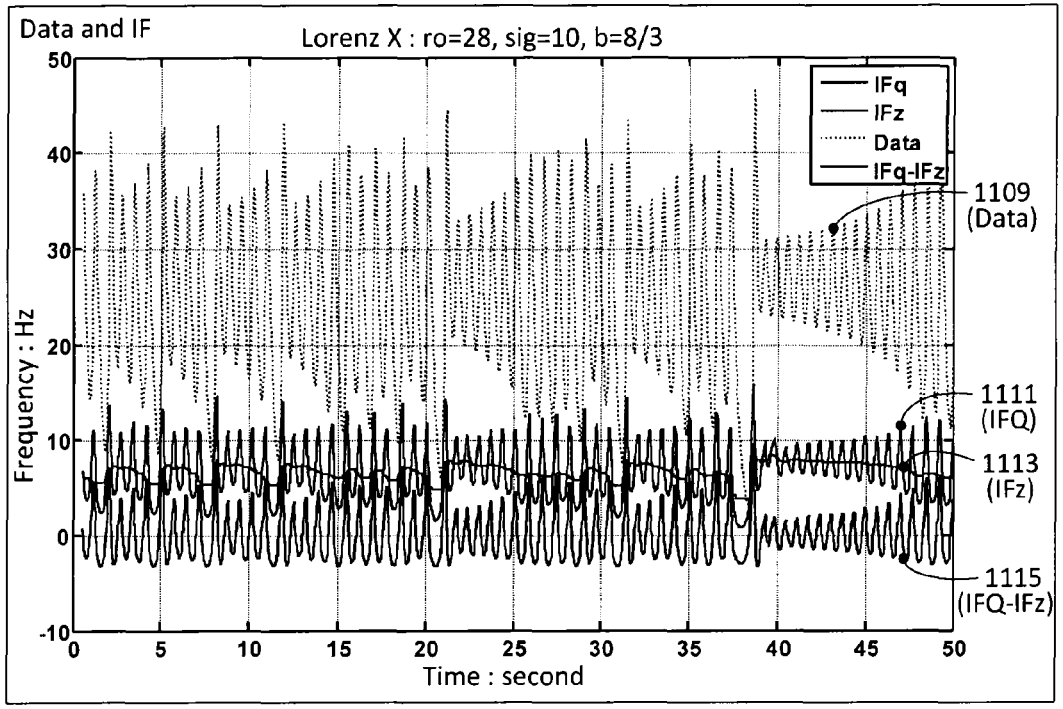
Figure 11C:
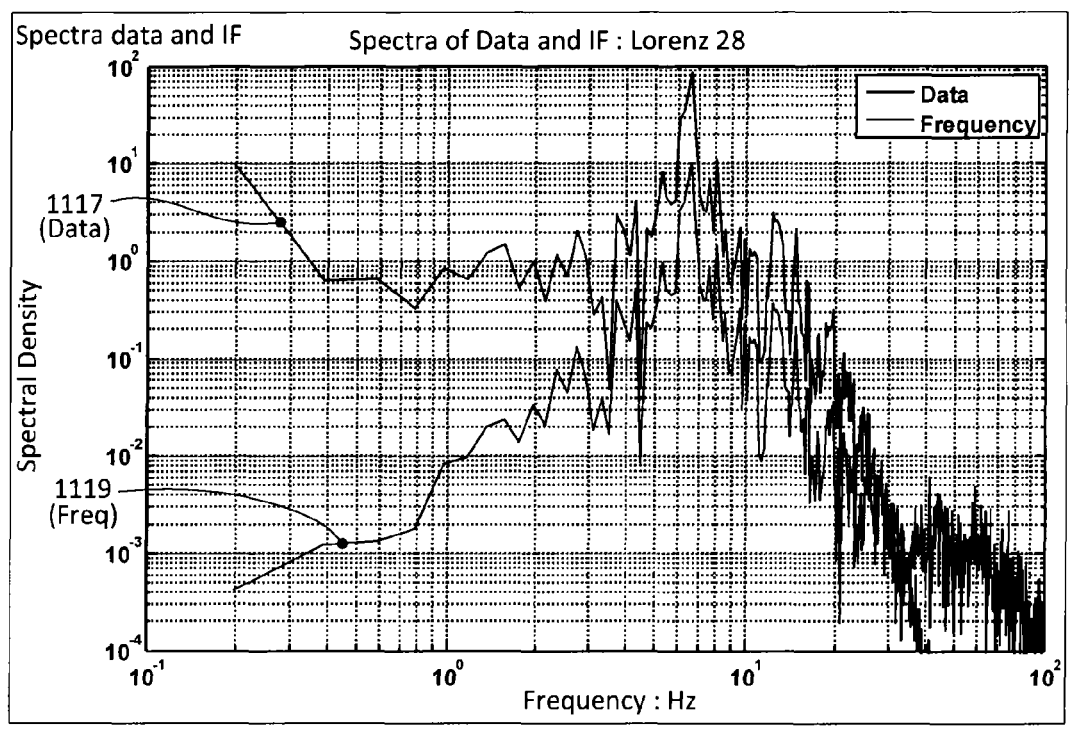
Figure 11D:
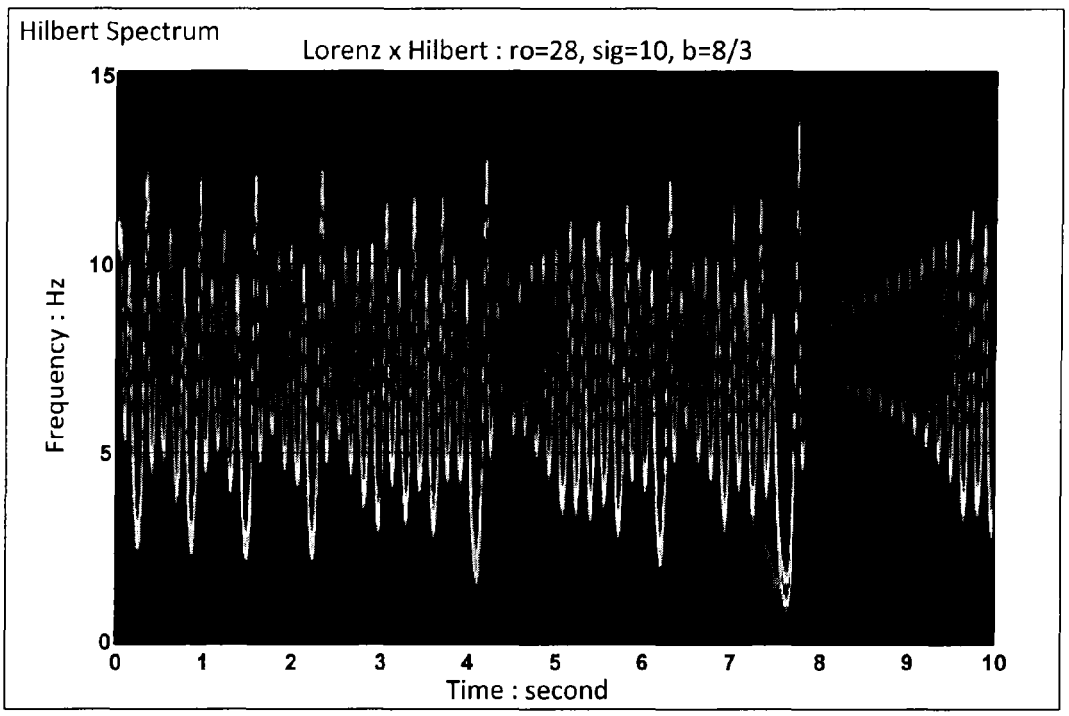
Figure 11E:
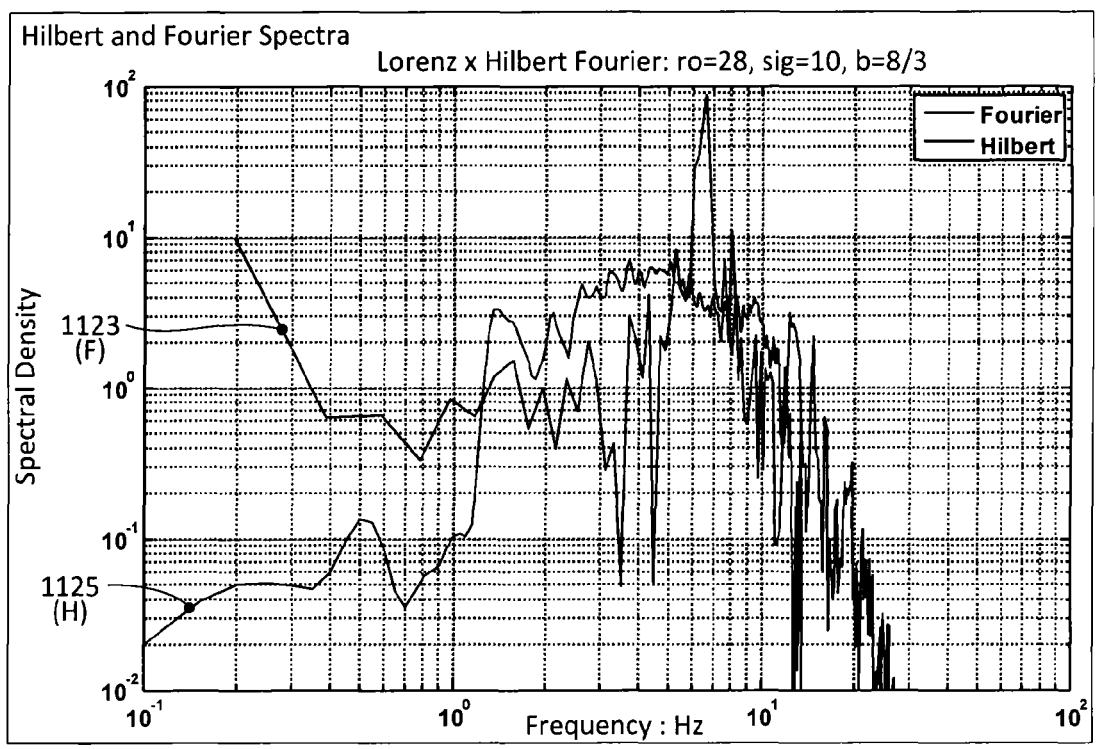
Figure 12A:
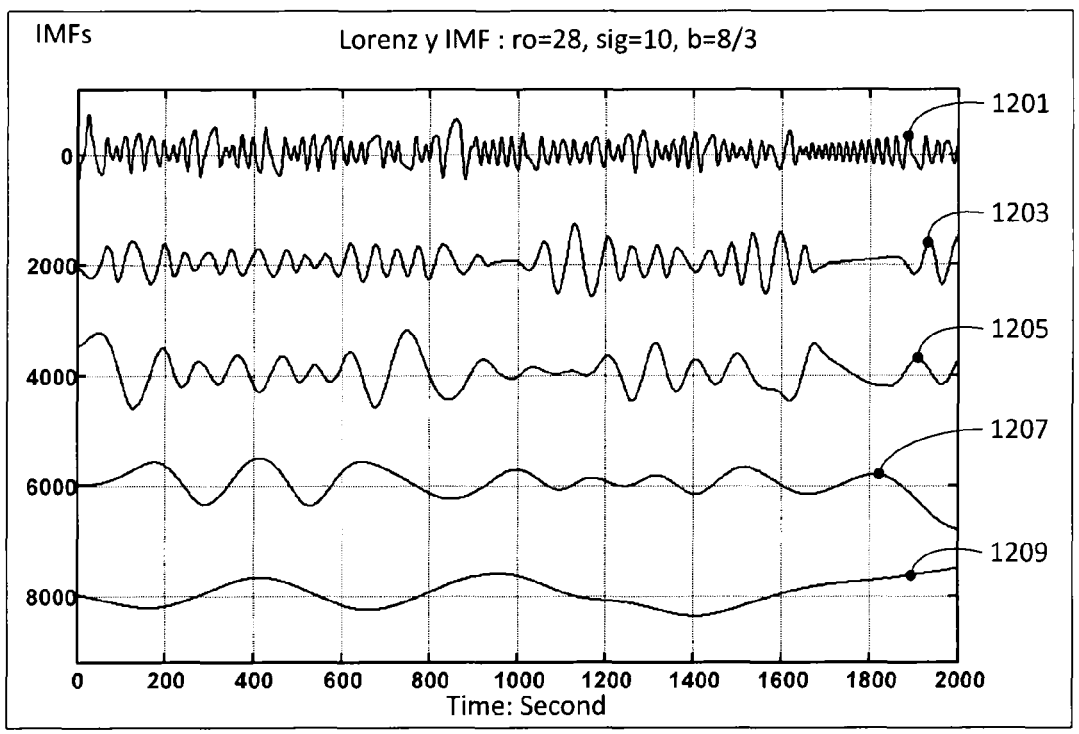
Figure 12B:
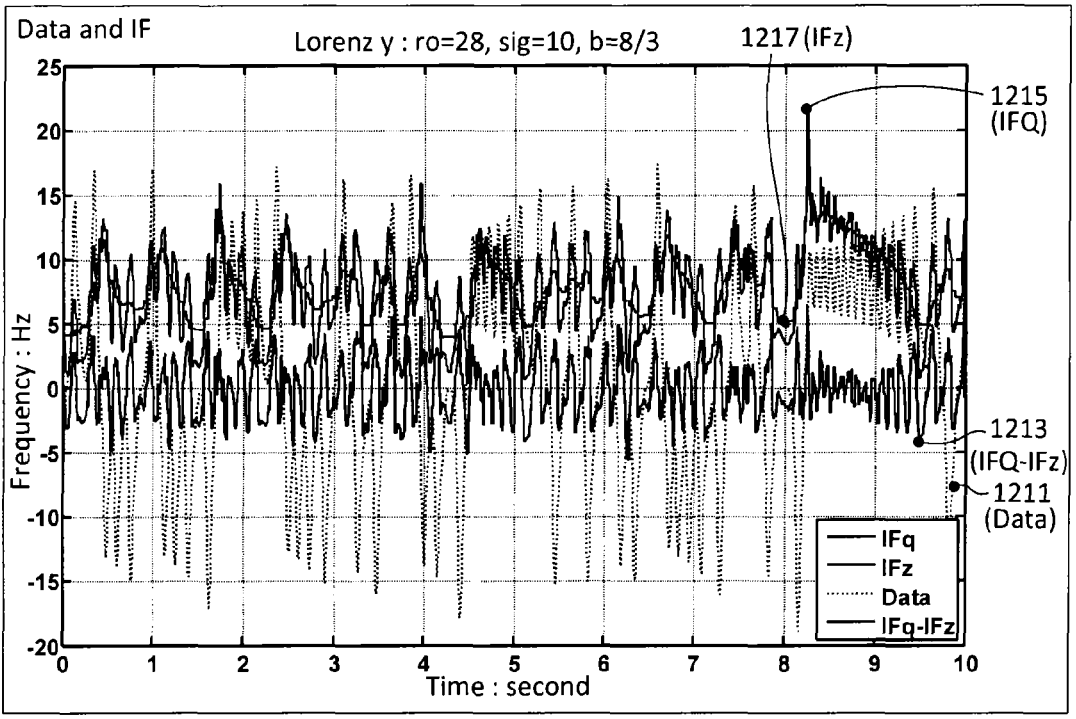
Figure 12C:
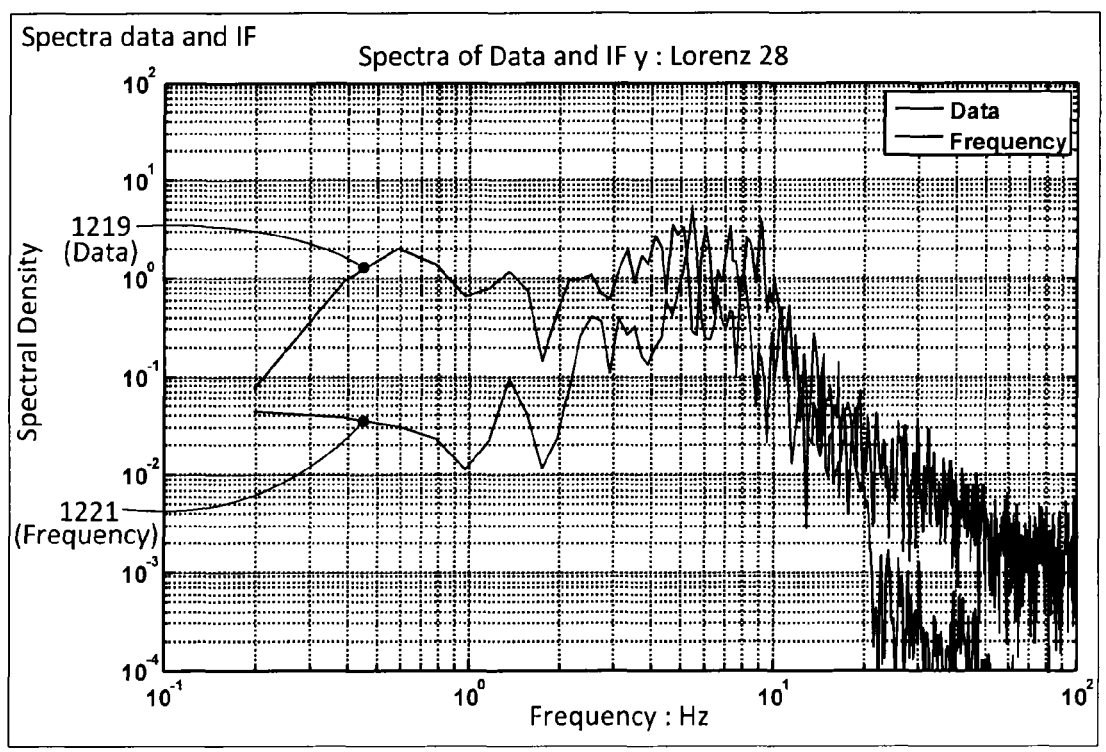
Figure 13A:
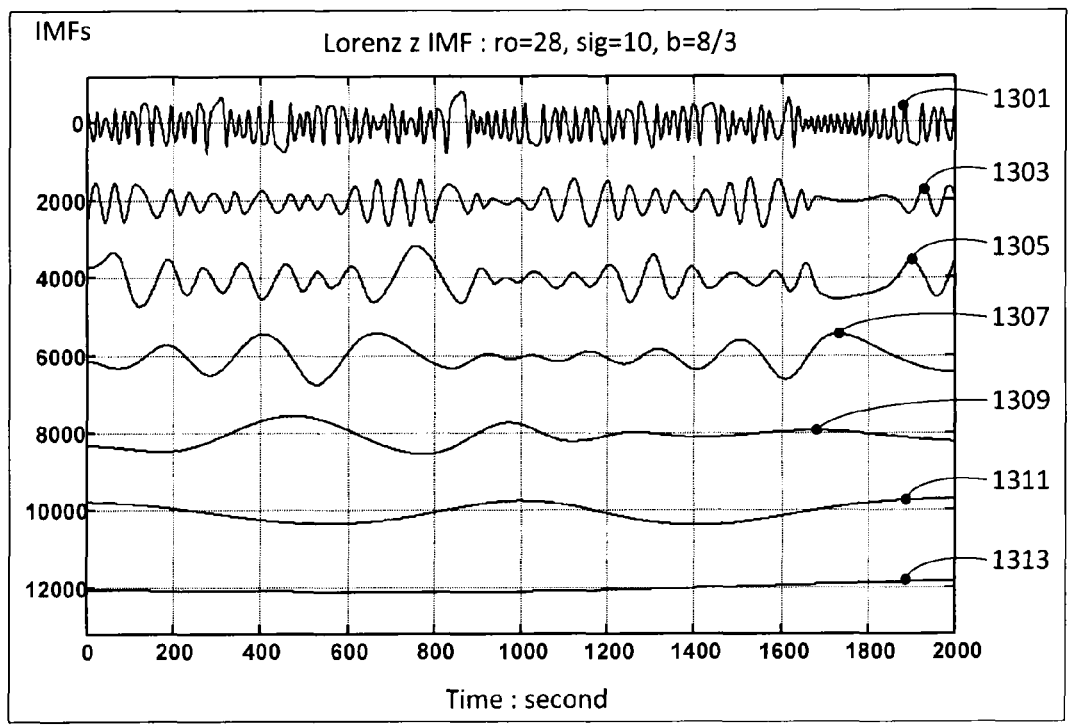

FIG. 4A shows the phase diagram for Duffing 1 model as given in Equation (14) with $\epsilon$ positive at 0.5 according to one embodiment of the present invention;

FIG. 4B shows the wave profile, the instantaneous frequency values determined by direct quadrature and zero-crossing and their difference for IMF1 of the Duffing 1 model according to one embodiment of the present invention, in which the 2 to 1 intra-wave frequency modulation pattern;

FIG. 4C show the summary of all the Degree of nonlinearity values for Duffing 1 Model according to one embodiment of the present invention, in which the CDN and DN for IMF1 are almost identical; the solutions are relative stable for all $\epsilon$ values, but the DN values are not changing monotonically with $\epsilon$ values; the DN values for the other IMFs are somewhat erratic due to computation stability; and FIG. 5A shows the wave profile, the instantaneous frequency values determined by direct quadrature and zero-crossing and their difference for IMF1 of the Duffing 2 model for $\epsilon=-0.2$ according to one embodiment of the present invention; notice the 2 to 1 intra-wave frequency modulation pattern;

FIG. 5B shows the summary of all the Degree of nonlinearity values for Duffing 2 Model for negative $\epsilon$ according to one embodiment of the present invention, in which the CDN and DN for IMF1 are almost identical; the DN values for the IMF2 are somewhat erratic due to computation stability;

FIG. 6A shows the phase diagram for Duffing 0 model as given in Equation (14) according to one embodiment of the present invention, with negative stiffness and $\epsilon$ positive at 1.00;

FIG. 6B shows the IMFs for the wave modeled data corresponding to the phase diagram given in FIG. 6A according to one embodiment of the present invention;

FIG. 6C shows the wave profile, the instantaneous frequency values determined by direct quadrature, the zero-crossing and their difference for IMF1 of the Duffing 0 model according to one embodiment of the present invention, in which the 2 to 1 intra-wave frequency modulation pattern;

FIG. 6D shows the Fourier spectra for the wave data and the instantaneous frequency values for IMF1 of Duffing 0 model according to one embodiment of the present invention, and the peak values of the spectra also show 2 to 1 ratio clearly;

FIG. 7A shows the phase diagram for Duffing 0 model as given in Equation (14) with negative stiffness and $\epsilon$ positive at 0.5 according to one embodiment of the present invention, in which the orbits start to show the classic chaotic butterfly patterns;

FIG. 7B shows the IMFs for the wave modeled data corresponding to the phase diagram given in FIG. 7A according to one embodiment of the present invention; instead of just one IMF dominates, here at least two IMFs have significant amount of energy due to the chaotic patterns;

FIG. 7C shows the wave profile, and the instantaneous frequency values determined by direct quadrature and zero-crossing and their difference for IMF1 of the Duffing 0 model according to one embodiment of the present invention, in which the 2 to 1 intra-wave frequency modulation pattern still clearly shown even with the up-and-down flips due to the butterfly pattern in the phase diagram;

FIG. 7D shows the Fourier spectra for the wave data and the instantaneous frequency values for IMF1 of Duffing 0 model according to one embodiment of the present invention; the peak value of the spectrum for the data could no longer depict the frequency modulation due to the highly nonstationary chaotic pattern. As a result, the 2 to 1 ratio could not be determined here;

FIG. 8 shows the summary of all the Degree of nonlinearity values for Duffing 0 Model for negative stiffness and positive $\epsilon$ according to one embodiment of the present invention; the CDN and DN for IMF1 are almost identical for $\epsilon$ larger than 0.8, when the CDN and DN values are decreasing with increasing $\epsilon$ values; for $\epsilon$ smaller than 0.8, the CDN and DN values are somewhat erratic, but the general trend is increasing with increasing $\epsilon$ values; to the DN values for all the IMFs are somewhat erratic due to computation stability;

FIG. 9A shows the phase diagram for Rossler model as given in Equation (15) with c=8.0 according to one embodiment of the present invention; here the orbits start to show the classic chaotic patterns;

FIG. 9B shows the IMFs for the wave modeled data corresponding to the phase diagram given in FIG. 9A; just one IMF dominates here even with the chaotic patterns;

FIG. 9C shows the wave profile, the instantaneous frequency values determined by direct quadrature, and the zero-crossing and their difference for IMF1 of the Rossler model according to one embodiment of the present invention; the sharp spike of the dominate period obscured the intra-wave modulation pattern here;

FIG. 9D shows the Fourier spectra for the wave data and the instantaneous frequency values for IMF1 in Rossler model according to one embodiment of the present invention; the peak value of the spectrum for the data barely depict the frequency modulation of the 1 to 1 ratio;

FIG. 10 shows the phase diagram for Lorenz model, as given in Equation (16), with $\rho=28$ according to one embodiment of the present invention; here the orbits start to show the famous classic chaotic butterfly patterns;

FIG. 11A shows the IMFs for x-component of the Lorenz model corresponding to the phase diagram given in FIG. 10 according to one embodiment of the present invention; just one IMF dominates here even with the chaotic patterns;

FIG. 11B shows the wave profile, the instantaneous frequency values determined by direct quadrature and the zero-crossing and their difference for IMF1 of the x-component Lorenz model according to one embodiment of the present invention; the 1:1 intra-wave frequency modulation pattern is clearly shown;

FIG. 11C shows the Fourier spectra for the wave data and the instantaneous frequency values for IMF1 x-component, Lorenz model according to one embodiment of the present invention; the peak value of the spectrum for the data clearly depict the frequency modulation of the 1 to 1 ratio;

FIG. 11D shows the Hilbert spectrum of the x-component according to one embodiment of the present invention; the intra-wave frequency is clearly seen to cover the wide range of 2 to 7 Hz;

FIG. 11E shows the marginal Hilbert and Fourier spectra for the Lorenz Model according to one embodiment of the present invention; with the high degree of nonlinearity and nonstationary, the Fourier spectrum is no longer meaningful; as a result, the spectral forms are totally different. The broadened spectral for m for the marginal Hilbert representation gives the typical intra-wave frequency modulation;

FIG. 12A shows the IMFs for y-component of the Lorenz model corresponding to the phase diagram given in FIG. 10 according to one embodiment of the present invention; due to the chaotic butterfly pattern, more than one IMF are showing prominent energy density here;

FIG. 12B shows the wave profile, the instantaneous frequency values determined by direct quadrature, the zero-crossing and their difference for IMF1 of the y-component in Lorenz model according to one embodiment of the to present invention; the 1:1 intra-wave frequency modulation pattern is clearly shown even with the chaotic pattern;

FIG. 12C shows the Fourier spectra for the wave data and the instantaneous frequency values for IMF1 y-component in Lorenz model according to one embodiment of the present invention; the peak value of the spectrum for the data could no longer depict the frequency modulation here;

FIG. 13A shows the IMFs for z-component of the Lorenz model corresponding to the phase diagram given in FIG. 10 according to one embodiment of the present invention; due to the chaotic butterfly pattern, more than one IMF are showing prominent energy density here.

Figure 13B:
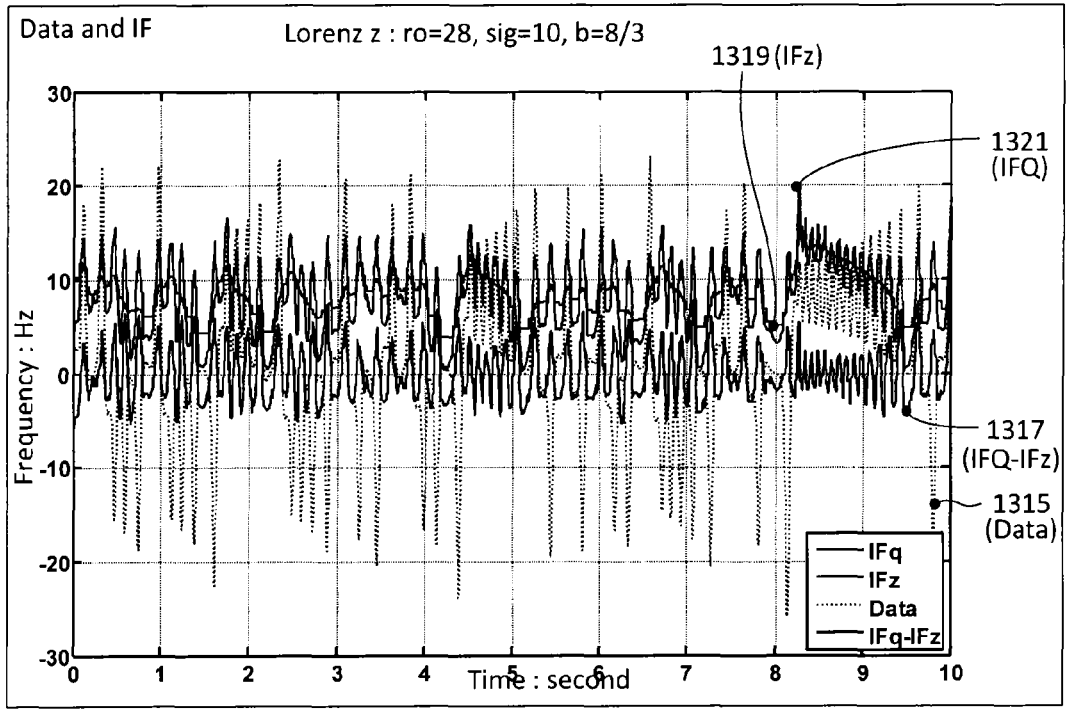
Figure 13C:
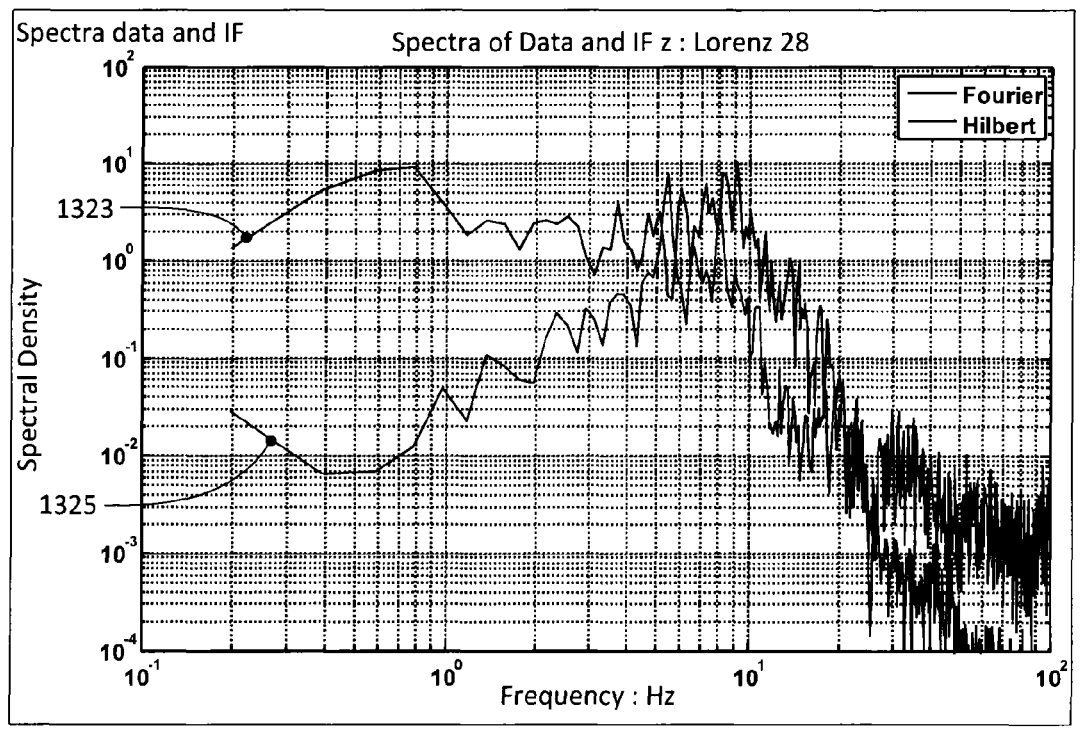
Figure 14A:
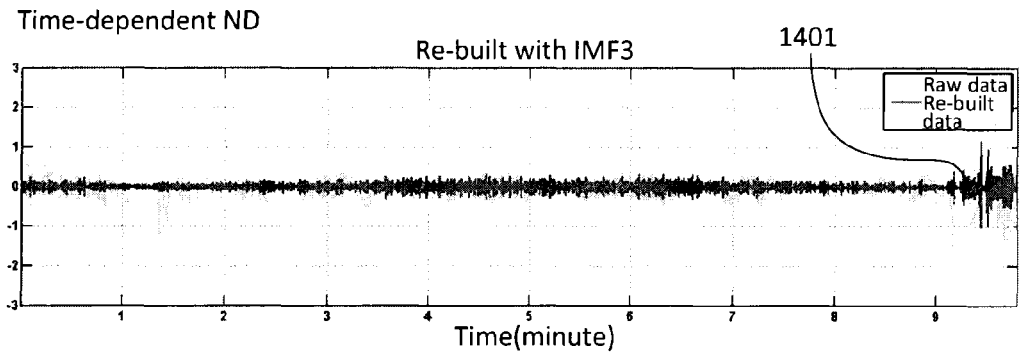
Figure 14B:
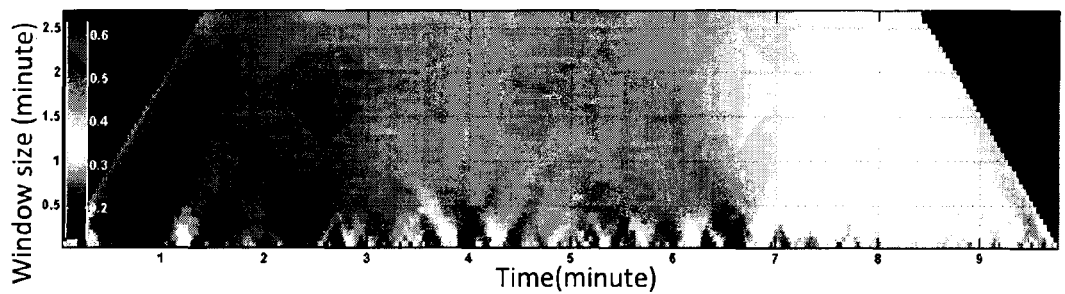
Figure 15:
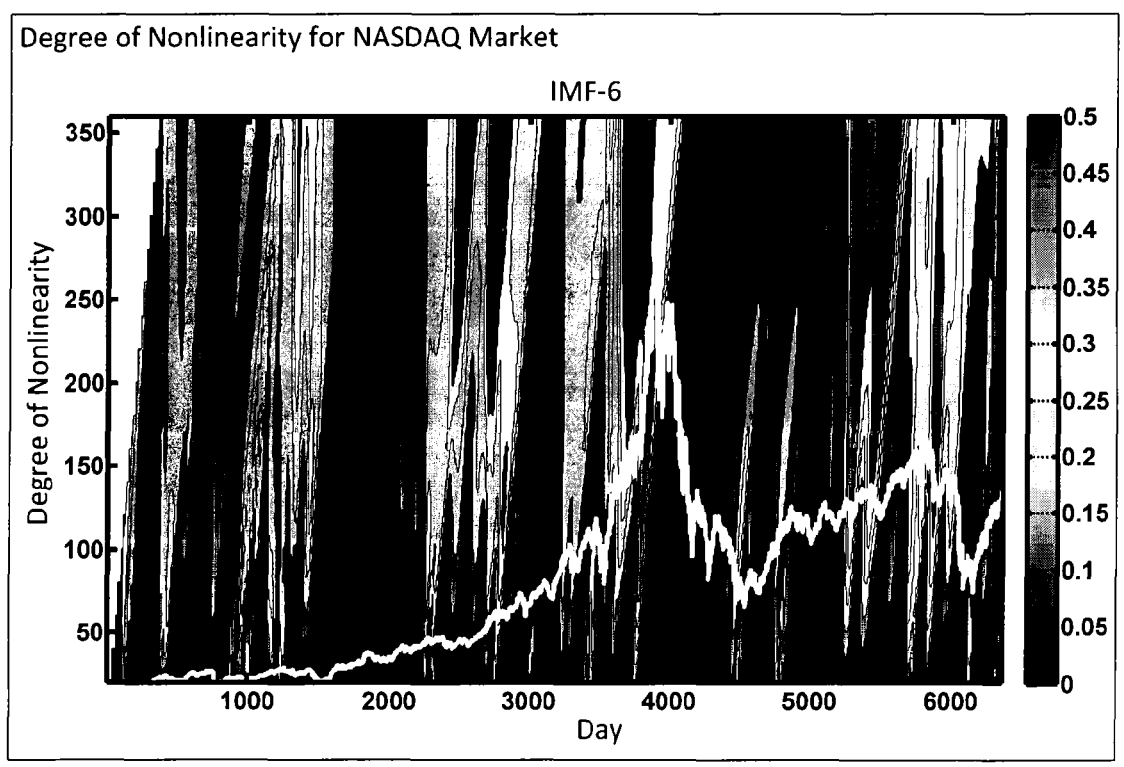
Figure 16:
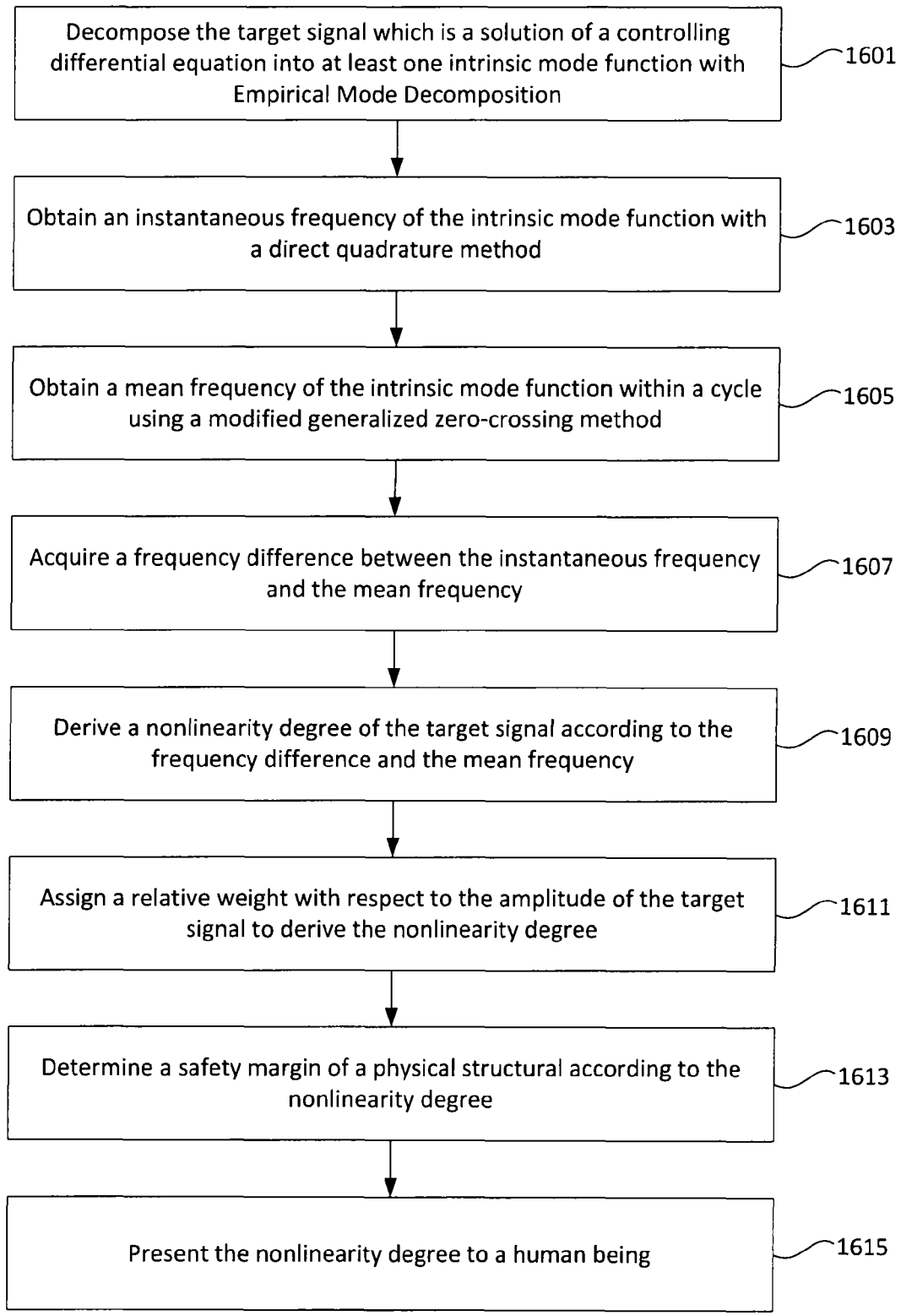
Figure 17:
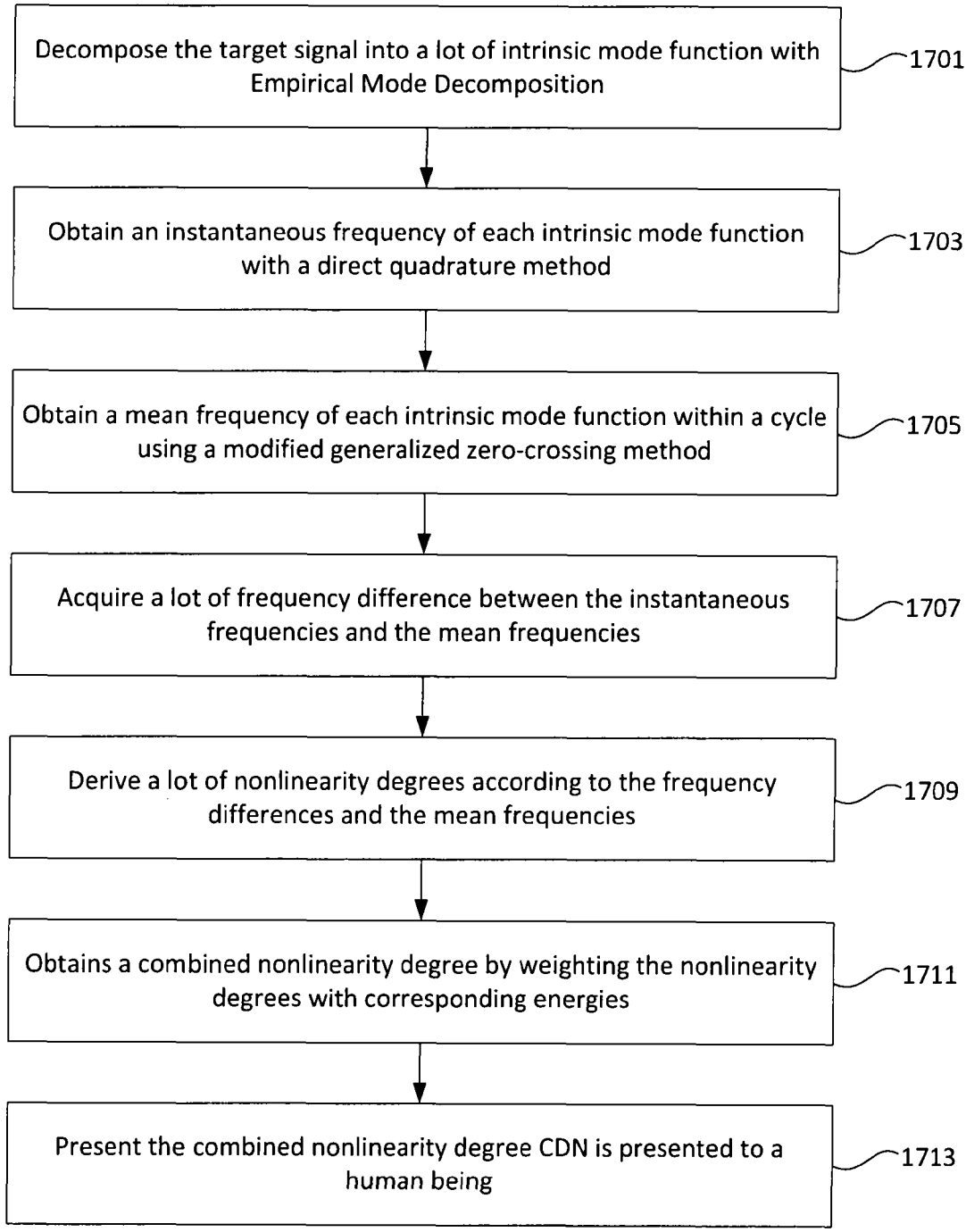
Figure 18:
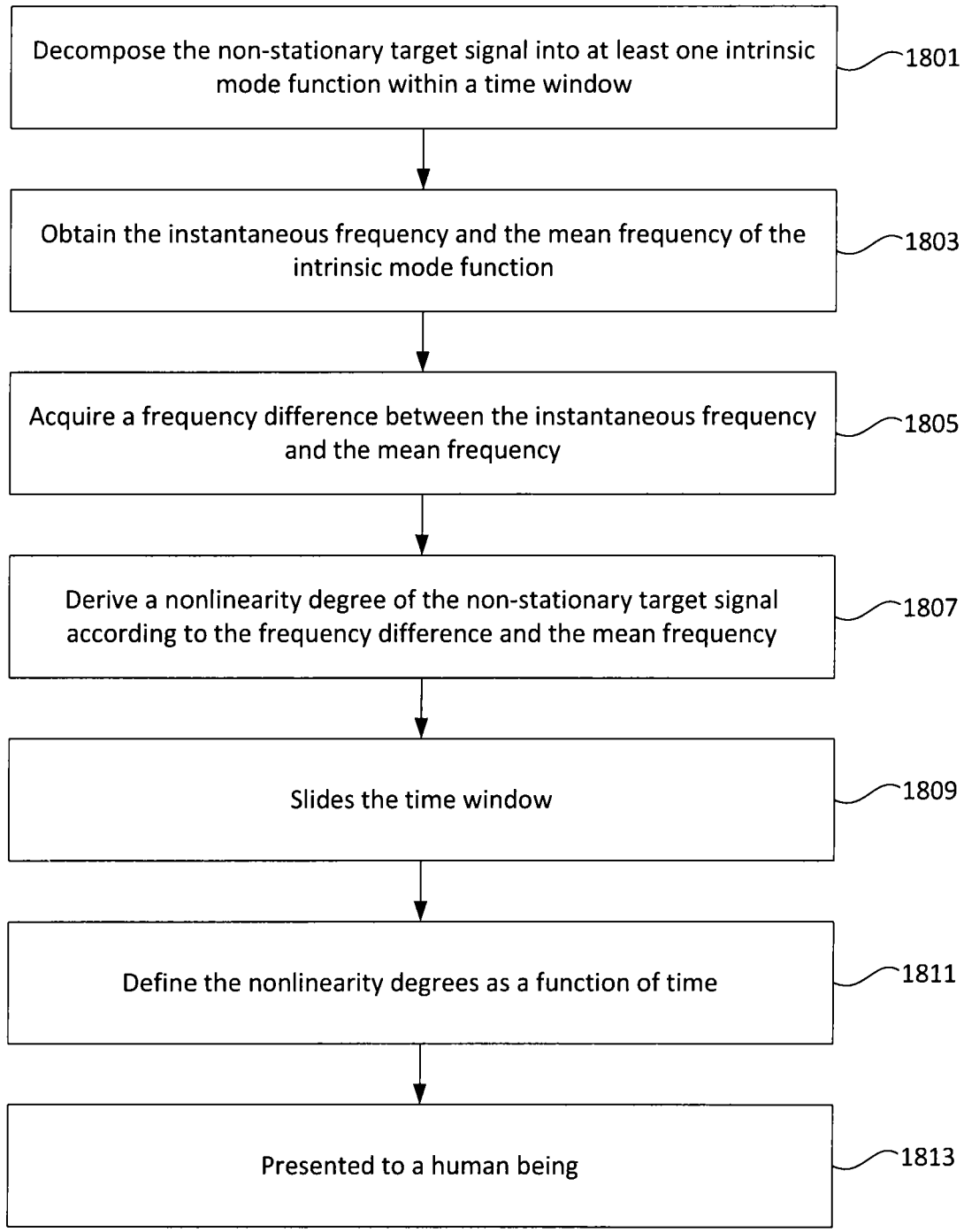
Figure 19:
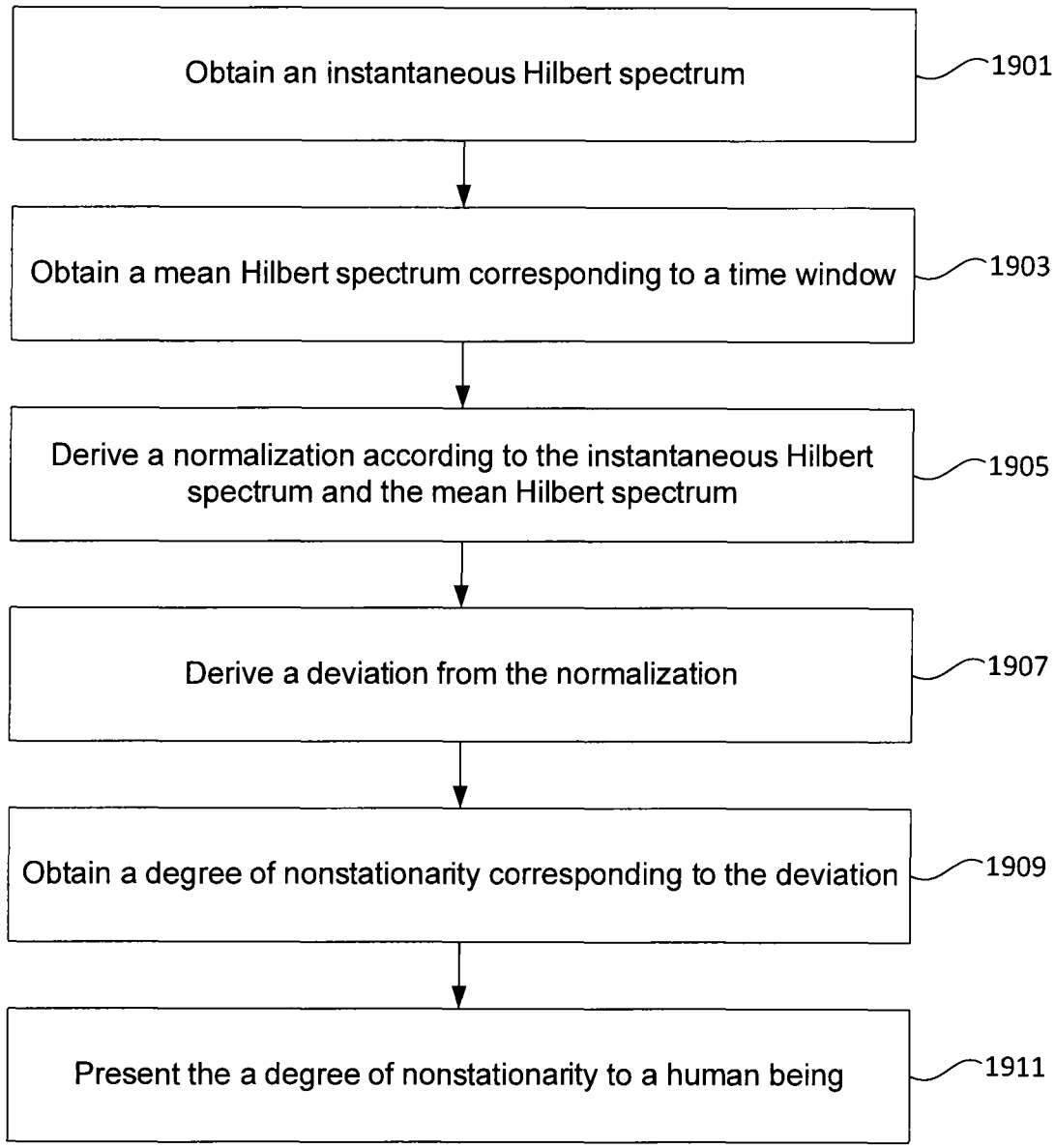

FIG. 13B shows the wave profile, the instantaneous frequency values determined by direct quadrature, the zero-crossing and their difference for IMF1 of the y-component in Lorenz model according to one embodiment of the present invention; the 1:1 intra-wave frequency modulation pattern is clearly shown even with the chaotic pattern;

FIG. 13C shows the Fourier spectra for the wave data and the instantaneous frequency values for IMF1 z-component in Lorenz model according to one embodiment of the present invention; the peak value of the spectrum for the data could no longer depict the frequency modulation here;

FIG. 14A and FIG. 14B show the diagram of the time-dependent degree of nonlinearity according to one embodiment of the present invention;

FIG. 15 shows the time dependent degree of nonlinearity of the NASDAQ data according to one embodiment of the present invention;

FIG. 16 is a flowchart of the method for obtaining and modeling a degree of nonlinearity of a target signal according to one embodiment of the present invention;

FIG. 17 is a flowchart of a method for obtaining and modeling a combined degree of nonlinearity of a target signal; and FIG. 18 is a flowchart of a method implemented by an electronic system for obtaining and modeling a degree of nonlinearity of a non-stationary target signal; and FIG. 19 is a flowchart of a method for quantifying and modeling a degree of nonstationarity.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Instead of using the qualitative system approach, we explore the intra-wave frequency modulation as proposed by Huang. The field is ready for a quantitative test that would also be applicable to non-stationary time series in general.

A Definition of Degree of Nonlinearity

Based on the state-of-the-arts review, one can see that all the test methods are data based. And none of the tests relies on inputs vs. outputs, but all use the observational data; therefore, we should examine the data in their physical characteristics. One of the unique characteristics of nonlinear processes, proposed by Huang et al (1998), is the intra-wave frequency modulation, which indicates that the instantaneous frequency changes within one oscillation cycle from one instant to the next one and from one location to the neighboring one. Intra-wave frequency modulation is the hallmark of nonlinear system. Let us examine a very simple nonlinear system given by the non-dissipative Duffing type equation as:

$$\frac{d^2x}{dt^2} + x + \varepsilon x^{n+1} = \gamma \cos\omega t, \tag{3}$$

with n as an integer. This equation could be re-written as:

$$\frac{d^2x}{dt^2} + x(1 + \varepsilon x^n) = \gamma \cos\omega t \tag{4}$$

We are not interested in the solution of this equation for the time being; rather, we will discuss the characteristics of the solution. For this purpose, we can treat the system given in Equation (4) as a virtue nonlinear spring or pendulum system. Then, the quantity within the parenthesis can be treated as a variable spring constant, or a variable virtue pendulum length. According to simple pendulum law, the frequency of the pendulum should be inversely proportional to the square root of its length. With this view, we can see that the frequency of this virtue pendulum, with its length as a variable, should change from location to location, and time to time, even within one oscillation cycle.

Figure 1A:
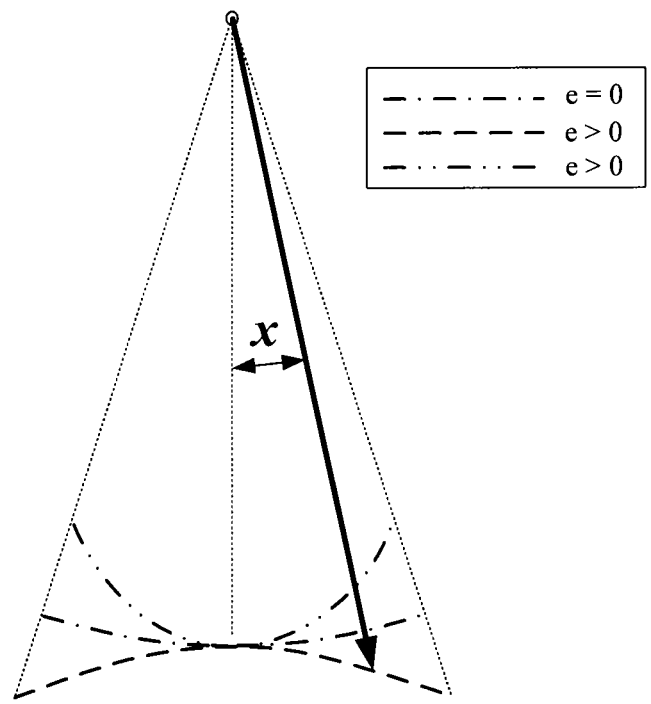
FIG. 1A and FIG. 1B show the virtue pendulum and corresponding waveforms for the controlling equation as given in Equation (1) according to one embodiment of the present invention.
Figure 1B:
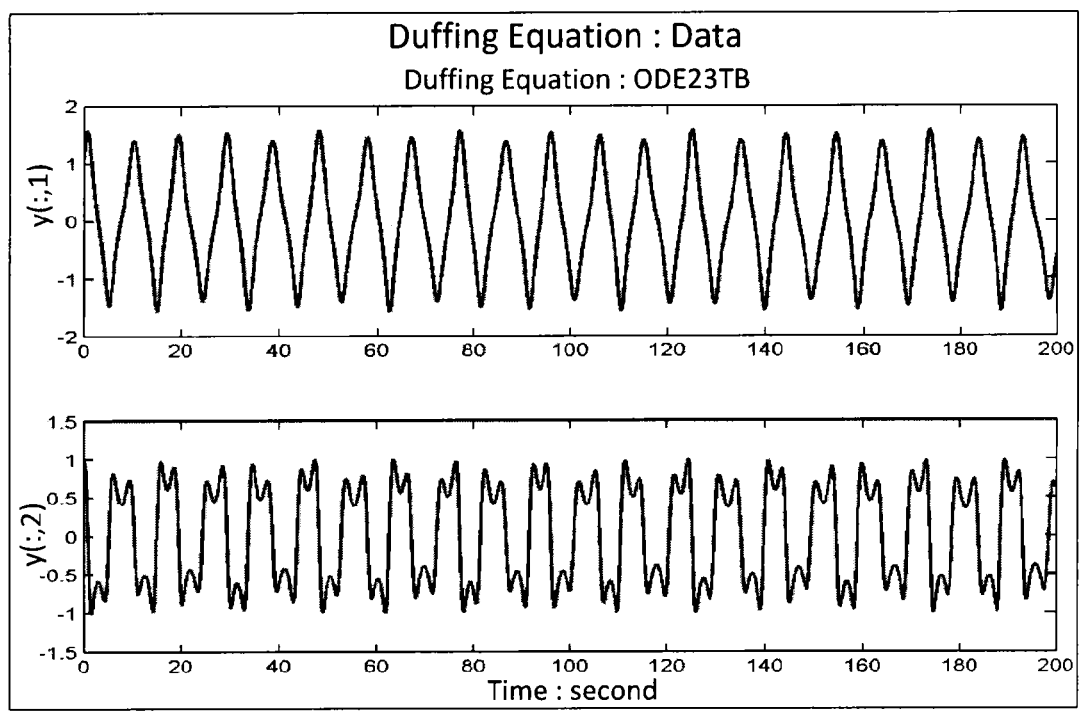

FIG. 1A and FIG. 1B show the virtue pendulum and corresponding waveforms for the controlling equation as given in Equation (1) according to one embodiment of the present invention, with odd powered nonlinearity gives the symmetric intra-wave frequency modulations and even powered nonlinearity gives the asymmetric intra-wave frequency modulations.

Indeed depending on the values of $\varepsilon$ and n, the virtue pendulum could produce very different oscillatory modes. Without loss of generality, let us assume that $\varepsilon$ is a positive constant. If n=0, the virtue pendulum is linear; the oscillation will be simple sinusoidal. If n=1 or any odd integer, the length of the is virtue pendulum would be asymmetric during one swing: the length will be longer when x is on the positive side and shorter when x is on the negative side as shown in FIG. 1A. As the frequency of a pendulum is inversely proportional to it length, the frequency will be high on the negative x value side comparing to the positive x value side. As a result, the resulting wave form is also asymmetric with sharp troughs and round peaks.

If n=2 or any even integer, the virtue pendulum will be symmetric as shown in FIG. 1B. Depending on the value of $\varepsilon$, the final wave form could have sharp crest and trough for negative $\varepsilon$ and round crest and trough for positive E.

The essence and the characteristics of the solution of the above equation can be captured by the following wave form:

$$x(t)=\cos(\omega t+\varepsilon \sin n\omega t) \tag{5}$$

The wave form is no longer sinusoidal as discussed by Huang et al (1998, 2009). In the past, the best we could do with these distorted wave data was to represent it with harmonics, and hence the term, harmonics distortion. Mathematically, harmonic distortion is the result of perturbation analysis, which is obtained by imposing a linear structure on a nonlinear system. Those harmonics have only mathematic meaning: to fit the profiles of a distorted wave; they have no physical meaning, for they could not be any part of the real motion. This could be illustrated clearly using the water wave as an example. Deep water surface progress waves of permanent shape were solved by Stokes (1847) with perturbation analysis. The wave surface is asymmetric with sharp crest and rounded trough; hence, the wave profile has a full suite of harmonics. It is well known that deep water surface waves have a distinct property: they are dispersive. However, none of the harmonics has such property. All the harmonics are propagating phase locked at the phase velocity dictated by the fundamental wave frequency. As a result, the wave number and frequency of the harmonics cease to have any physical meaning, for they are non-physical quantities. Furthermore, the form of the harmonics also depends on the basis used in the expansion. For perturbation analysis, all linear systems have a simple harmonic solution; sine and cosine function become the natural choice of the building blocks. In general, the sine and cosine function has been used only because they are the basis for Fourier analysis. Harmonics could also assume other functional form if wavelet expansion is employed. Thus, we can see that the harmonics are really mathematical artifacts to describe any wave form that is not intrinsically the basis used in the expansion. The physically meaningful way to describe the system should be in terms of the instantaneous frequency as discussed by Huang et al (1998, 2009). To illustrate the effect of instantaneous frequency, let us consider the mathematical model used in Huang (1998):

$$x(t)=\cos(\omega t+\epsilon\sin 2\omega t) \qquad (6)$$

Figure 2A:
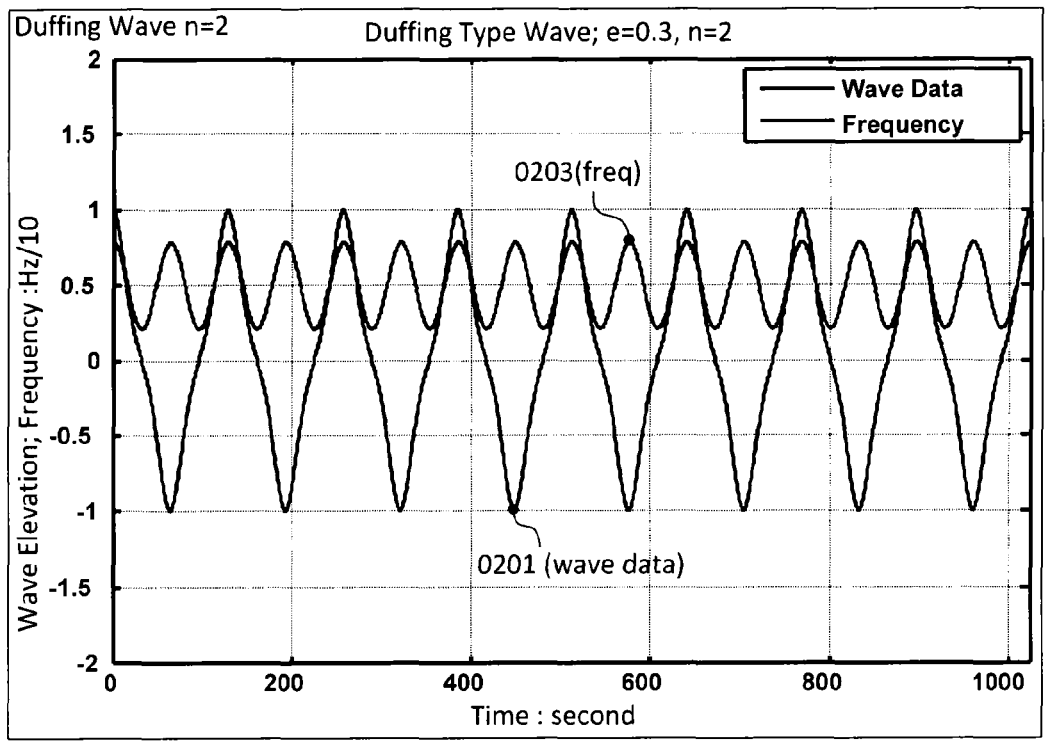
FIG. 2A show the wave profile and the instantaneous frequency for the intra-wave frequency modulation model as given in Equation (6) for n=2 according to one embodiment of the present invention.

FIG. 2A show the wave profile 0201 and the instantaneous frequency 0203 for the intra-wave frequency modulation model as given in Equation (6) for n=2 according to one embodiment of the present invention, which will have a symmetric wave form because n+1 is an odd number for the equivalent virtue pendulum. For $\epsilon$ set at 0.3, we would have the oscillation given in FIG. 2. It has been shown by Huang et al (1998) that the wave form given in Equation (6) is equivalent to $$x(t) \approx \left(1 - \frac{\varepsilon}{2}\right)\cos\omega t + \frac{\varepsilon}{2}\cos 3\omega t + \ldots \qquad (7)$$

which is exactly the Fourier expansion of the wave form given by Equation (6). Interestingly, this would also be the solution of the Duffing type cubic nonlinear equation, if one solves it with perturbation method (Kovorkian and Cole, 1981). Indeed, the form of solution from perturbation depends sole on the power of the nonlinear term: for a cubic nonlinear term, the solution would have third harmonics as indicated in Equation (7). In terms of instantaneous frequency, the wave given in Equation (5) should have an instantaneous frequency with intra-wave modulation as:

$$\Omega=\omega(1+\epsilon n\cos n\omega t) \qquad (8)$$

Figure 2B:
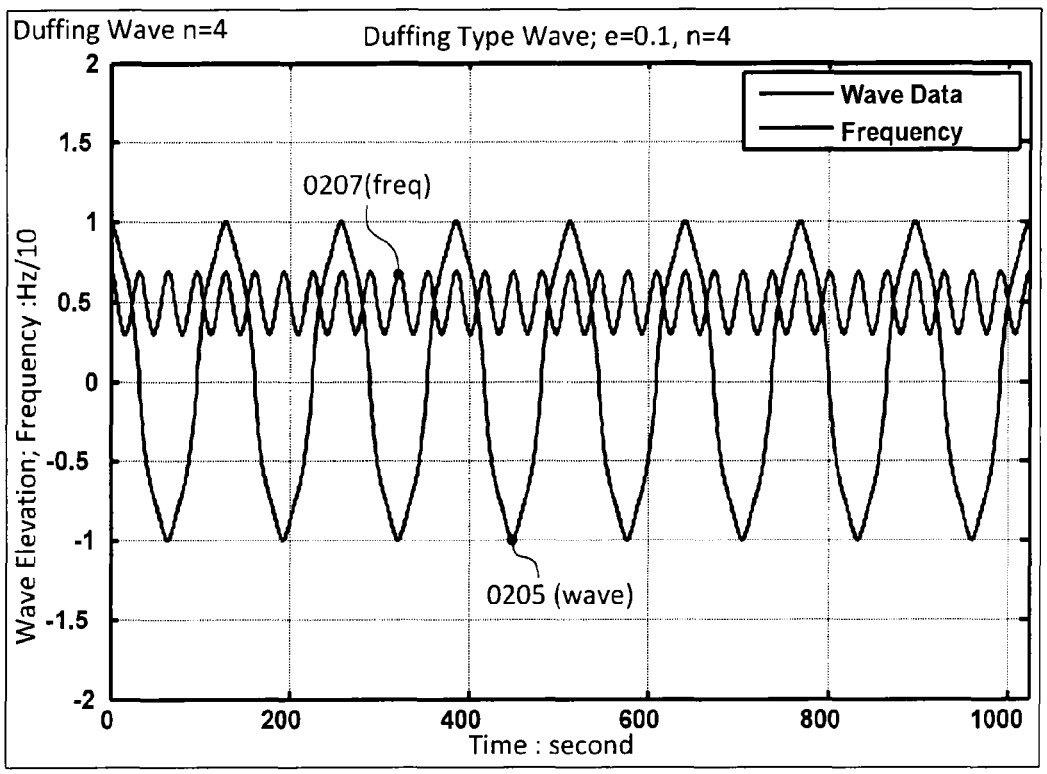
FIG. 2B shows the Equation (6) given in n=4 according to one embodiment of the present invention, which will still have a symmetric wave form because n+1 is an odd number for the equivalent virtue pendulum.
Figure 2C:
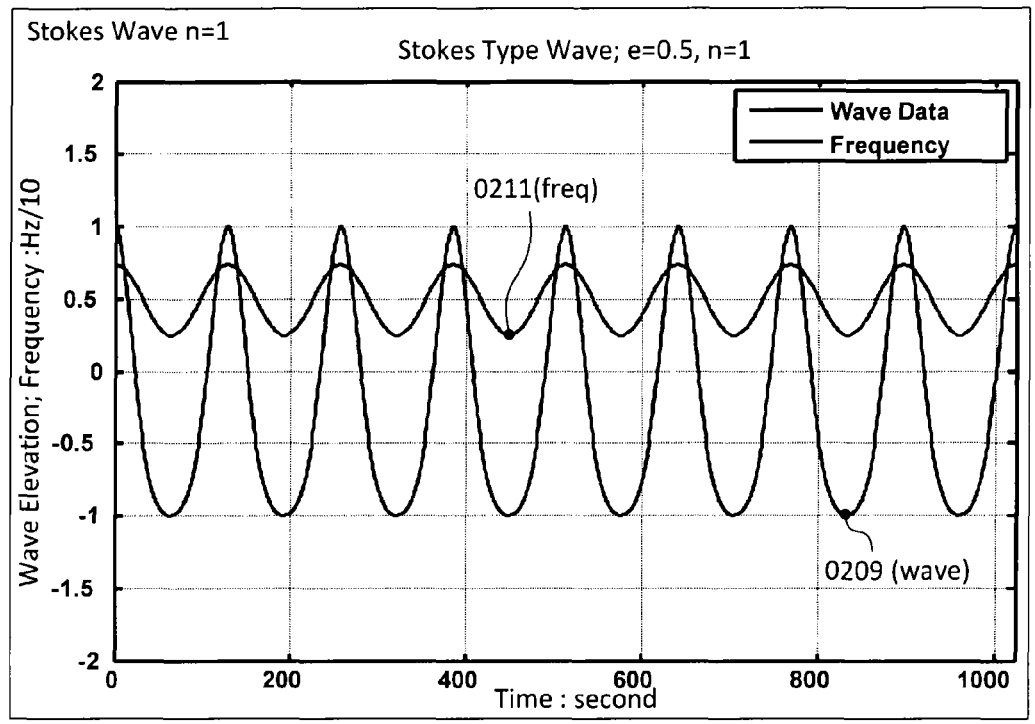
FIG. 2C shows the Equation (6) given in n=1 according to one embodiment of the present invention, which will have a asymmetric wave form because n+1 is an even number for the equivalent virtue pendulum.
Figure 2D:
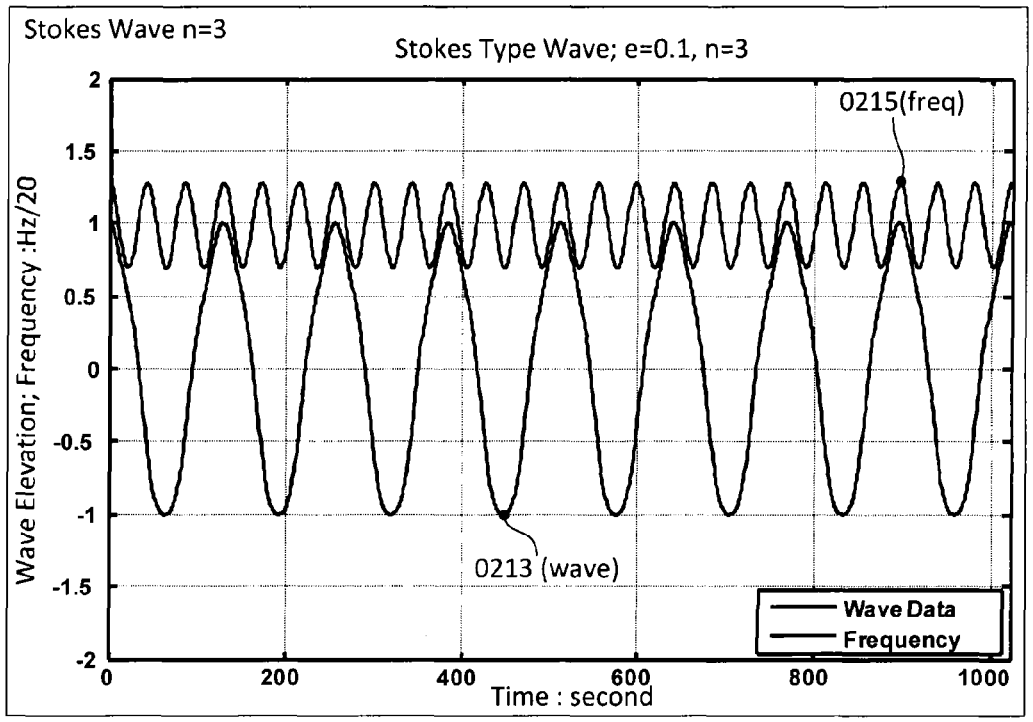
FIG. 2D shows the Equation (6) given in n=3 according to one embodiment of the present invention, which will have a asymmetric wave form because n+1 is an even number for the equivalent virtue pendulum.

Instead of a series of spurious harmonics, the instantaneous frequency would have intra-wave modulation as given in Equation (8). FIGS. 2A, 2B, 2C and 2D give examples to illustrate the relationship between the waveform 0201/0205/209 and the instantaneous frequency 0203/0207/0211 with intra-wave modulation. When n is an even number, the waveform should be symmetric as shown in FIG. 1. The frequency of intra-wave modulation could clearly be counted from the wave form and instantaneous frequency values. For n=2 or 4, the frequency of intra-wave modulation is exactly 2 or 4 times of the wave form frequency. When n is an odd number, the wave form should be asymmetric also shown in FIG. 1. For n=1 or 3 as shown in FIGS. 2b and c, the frequency of intra-wave modulation is exactly 1 or 3 times of the wave form frequency. Therefore, the comparison between the frequency of the intra-wave frequency modulation and the frequency of the wave data is a good indicator of the property of the controlling differential equation: for the n-time intra-wave frequency modulation, the power of the nonlinear term in a simple equivalent differential equation should be n+1, as comparison between Equations (3), (4), (5) and (8).

Additionally, the instantaneous frequency is defined through a derivative; it is very local. Now, it can be also be used to describe the detailed variation of frequency within on oscillation and an indicator of the properties of the controlling differential equation. These are the feats unattainable with any of the traditional methods. Consequently, as discussed by Huang et al (1998), the instantaneous frequency is such a natural solution for the describing the solutions of nonlinear systems.

From the above discussion, we could define a measure of the degree of nonlinearity based on the modulation of the instantaneous frequency. Let us consider a generalized intra-wave modulated wave form as given in Equation (5) and the corresponding instantaneous frequency given in Equation (8). From the above discussions, we can see that the departure of the instantaneous frequency to the constant mean frequency is a measure of the wave form distortion, which should be a fair way to measure nonlinearity also. It should be pointed out here that although both instantaneous frequency and the harmonics could be used to describe wave form distortion, the reason we opt to use the new idea of instantaneous frequency rather than the traditional well established Fourier representation is clear: the harmonics are all in the high frequency range; therefore, they are subjected easily to the interference of noise. Furthermore, there is no way one could identify uniquely which harmonic component is generated by which specific fundamental. For example, two wave trains with frequency of 1 and 2 Hz, would have harmonics at all the digital numbers 1, 2, 3, ... Hz. The components at 4 Hz could be the 4th harmonics of the 1 Hz wave, but it could also be the 2nd harmonics of the 2 Hz wave. Yet the same wave would have to propagate at different phase velocity as dedicated by the fundamentals. Such a confused state of demands and conditions has made harmonics useless as an indicator for nonlinearity. The instantaneous frequency approach proposed here is totally different: The intra-wave frequency modulation occurs all in the neighborhood of the low fundamental frequency. Therefore, the modulation is not subjected to the influence of the ambient noise. Additionally, the intra-wave frequency modulation could be easily assigned and attributed to the specific fundamental uniquely. Most importantly, the strength of the modulation is in direct proportion to the nonlinearity as measured by the deviation from the constant mean frequency. With all these considerations, we believe the measure of nonlinearity based on the deviation of instantaneous frequency from the constant mean value is logic and practical.

Indeed, the degree of nonlinearity is determined uniquely by the quantity n and $\epsilon$, which had appeared in the expansion of the intra-wave modulation form as in Equations (6) and (7). There, the value of both n and $\epsilon$ had determined the form of expansion. In terms of perturbation analysis, the combination of n and $\epsilon$ indeed served to quantify the nonlinear characteristics of the nonlinear behavior. Therefore, it is only nature to define the degree of nonlinearity as proportional to $$\left\{\left(\frac{IF - IF_z}{IF_z}\right)^2\right\}^{1/2} = \frac{n\varepsilon}{\sqrt{2}}, \qquad (9)$$

in which IF stands for the instantaneous frequency, and IFz stands for the constant mean frequency over one wave cycle. In this sense, IFz could be the zero-crossing frequency. As discussed by Huang et al (2009) on instantaneous frequency, the IFz here is not exact the same as the generalized zero-crossing frequency, for in that definition for the generalized zero-crossing frequency we had emphasized time resolution. As a result, we have included frequency defined from partial wave. Here the zero-crossing frequency has to be defined for a whole wave, which includes only the values from crest-to-crest, trough-to-trough and up (down)-zero-crossing-to-up (down)-zero-crossing. Thus the definition for the degree of nonlinearity based on intra-wave frequency modulation considerations could serve the simple cases given here very well, but natural systems are never simple. Complications from amplitude and co-existing motions have to be considered as well. This will be done as follows:

For slightly more complication systems, the degree of nonlinearity should also consider the influence from amplitude contribution. It is obvious that, in a wave train, the large amplitude distorted waves should contribute more to the degree of nonlinearity of the wave train than the smaller amplitude ones. Therefore, the degree of nonlinearity (DN) should also be weighted by the amplitude as well:

$$DN = std\left(\left(\frac{IF - IF_z}{IF_z}\right) \cdot \frac{a_z}{\overline{a_z}}\right), \quad (10)$$

where az stands for the zero-crossing amplitude of a local whole wave, and the over-bar indicates the mean value.

For even more complicate systems, the final wave form could consist of many intrinsic components. The physical meaningful way to separate the components is through the Empirical Mode Decomposition proposed by Huang et al (1998) or the ensemble variation by Wu and Huang (2009), and the relevant American Provisional Application Ser. No. 61/195,894, and American application Ser. No. 12/411,539 are herein incorporated by reference. In addition, U.S. Pat. No. 6,990,436 and U.S. Pat. No. 5,983,162 are also herein incorporated by reference.

The combination of Empirical Mode Decomposition (EMD) with the Hilbert Spectral Analysis (HSA) designated as the Hilbert-Huang Transform (HHT). The decomposition is designed to seek the different simple intrinsic modes of oscillations in any data based on local time scales. The EMD is implemented through a sifting process that uses only local extrema. From any data rj-1, say, the procedure is as follows: 1) identify all the local extrema and connect all local maxima (minima) with a cubic spline as the upper (lower) envelope; 2) obtain the first component h by taking the difference between the data and the local mean of the two envelopes; and 3) treat h as the data and repeat steps 1 and 2 until the envelopes are symmetric with respect to zero mean under certain criterion. The final h is designated as cj. A complete sifting process stops when the residue, $r_n$, becomes a monotonic function or a function with only one extrema from which no more IMF can be extracted. In short, the EMD is an adaptive method that decompose data x(t) in terms of IMFs cj and a residual component $r_n$, i.e., $$x(t) = \sum_{j=1}^{n} c_j + r_n$$

In the above equation, the residual component $r_n$ could be a constant, a monotonic function, or a function that contains only a single extrema, from which no more IMF can be extracted. In this way, the decomposition method is adaptive, and, therefore, highly efficient. As the decomposition is based on the local characteristics of the data, it is applicable to nonlinear and nonstationary processes.

As discussed by Huang et al (1998), these Intrinsic Mode Function components are the only physical meaningful decomposition. Each component would represent a sub-system of motion with its own physical meaning. Particularly, a simple oscillatory mode is called intrinsic mode function (IMF) which satisfies: (a) in the whole data set, the number of extrema (maxima value or minima value) and the number of zero-crossings must either equal or differ at most by one; and (b) at any point, the mean value of the envelope defined by the local maxima and the envelope defined by the local minima is zero.

To overcome the scale mixing problem, a new noise-assisted data analysis method was proposed, the Ensemble EMD (EEMD), which defines the true IMF components as the mean of an ensemble of trials, each consisting of the signal plus a white noise of finite amplitude.

The Ensemble EMD algorithm contains the following steps:

Step a add a white noise series to the targeted data;

Step b decompose the data with added white noise into IMFs;

Step c repeat step a and step b again and again, but with different white noise series each time; and Step d obtain the (ensemble) means of corresponding IMFs of the decompositions as the final result.

To compute the combined degree of nonlinearity (CDN) of the whole system, we propose to weight the contribution of each IMF component that is proportional to the energy of each IMF as $$CDN = \sum_{j=1}^{N} \left( DN_j \frac{c_j^2}{\sum_{k=1}^{N} c_k^2} \right), \quad (11)$$

for we have:

$$x(t) = \sum_{j=1}^{N} c_j \Rightarrow x^2(t) = \sum_{j=1}^{N} c_j^2 \quad (12)$$

Therefore, the normalized weighting given here has properly consider the energy contain of each constituting IMF and also conserves energy.

With the above definitions of the DN and CDN, we can compute them by Empirical Mode Decomposition and Hilbert Spectral Analysis or the HHT (Hilbert-Huang Transform) readily. From the definitions, one can see that DN is proportional to the product of $\epsilon$ and n, provided that the amplitude fluctuation is not too large. These two parameters, however, represent totally different characteristics of the nonlinearity: the parameter n gives the information of the form of nonlinearity, whether it is quadratic or cubic nonlinearity in a simple equivalent differential equation. As discussed above, this relationship between n and the power of its control equation can be easily verified through perturbation analysis. Therefore, it should be a key parameter in determining the degree of nonlinearity. The parameter $\epsilon$ gives the magnitude of the nonlinearity term. Together, n and $\epsilon$ give us the indication of the basic characteristics of the equivalent controlling differential equation that generate the signal. In the system approach view, the above parameters would give us some useful system identification information.

Now, we will show how to compute the parameters separately through some simple manipulations. From equation (8), we can see that n can be determined from the modulations of the instantaneous frequency relative to the mean frequency. The modulation could even be determined by a Fourier spectral analysis, for here we are after a mean value only. In case the frequency and especially the IMF component data are highly variable in amplitude, the Fourier spectrum would be too complicated to be of any use. The modulation should be determined in the time domain by direct counting the number of instantaneous frequency modulation in a given time span of the physical wave span in the data as discussed above. This direct way is much easier and could be implemented with minimum efforts even if the amplitude fluctuation is large. Once the value of n is determined, we could also estimate the value of $\epsilon$, with the help of DN, provided that amplitude does not fluctuate too much. Based on our experience, the values computed in this way is quite accurate even if there are moderate degrees of amplitude fluctuation. It should be pointed out that the DN given here has an imposed limitation of its values: from Equation (8), we can see that the product $n\epsilon$ cannot be greater than unit; otherwise, the instantaneous frequency would have negative values, a situation has been excluded based on the definition of IMFs and our study of instantaneous frequency (Huang et al 2009). Therefore, the degree of nonlinearity should always be between 0 and 1.

On the Degree of Nonstationarity

As for the nonlinearity, the definition of nonlinearity is also qualitative: Based on the traditional definition, a process can be either stationary or nonstationary with no quantitative measure. The strict stationary is defined as: For a random variable, x(t), if $$\langle |x(t)|^2 \rangle < \infty, \langle x(t) \rangle = m,$$

and that $$[x(t_1), x(t_2), \ldots x(t_n)] \text{ and } [x(t_1+\tau), x(t_2+\tau), \ldots x(t_n+\tau)] \quad (1')$$

have the same joint distribution for all real valued $\tau$. The wide sense stationary is defined as: For a random variable, x(t), if $$\langle |x(t)|^2 \rangle < \infty, \langle x(t) \rangle = m,$$

and that $$[x(t_1), x(t_2)] \text{ and } [x(t_1+\tau), x(t_2+\tau)] \quad (1')$$

Have the same joint distribution for all real valued $\tau$. Therefore, $$\langle x(t_1)x(t_2) \rangle = C(t_1-t_2). \quad (2')$$

In many applications, a more precise quantitative definition for stationary is much more desirable. With the energy-frequency-time distribution given, we can actually defined the stationarity quantitatively now. As we stated above, the classic definitions of stationarity given in Eqs (1') and (2') are dichotomous: A process is either stationary or not; the description is only qualitative. Such definitions are both stringent and useless at the same time: Few data sets can satisfy the rigor of these definitions; consequently, no one even bothers to use them for checking the stationarity. As a result data as nonstationary as earthquake and seismological signals are routinely treated as stationary. Sometimes, for some obvious nonstationary data, two less stringent definitions are invoked: The piecewise stationary, and asymptotically stationary. These definitions are still dichotomous. To further quantify the statistical processes, an index is needed to give a measure of how far the process deviates from stationarity; a prerequisite for such a definition is a method to present the data in the frequency-time space. Having established the Hilbert Spectrum by Huang et al (1998), they introduced the index of stationarity as follows:

The first step to define the Degree of stationarity, DS($\omega$), is to find the mean marginal spectrum, n($\omega$), as $$n(\omega) = \frac{1}{T} h(\omega) \quad (3')$$

Then, the Degree of Stationarity is defined as $$DS(\omega) = \frac{1}{T} \int_0^T \left[1 - \frac{H(\omega, t)}{n(\omega)}\right]^2 dt \quad (4')$$

in which the integrand is similar to the intermittency defined in the Wavelet analysis. We decided to adopt the integration representation because it gives a quantitative measure of the whole data set. Obviously, for a stationary process, the Hilbert spectrum cannot be a function of time. In that case, the Hilbert Spectrum will consist of only horizontal contour lines; DS($\omega$) will then be identically zero. Only under this condition, will the marginal spectrum be identical to the Fourier spectrum, then the Fourier spectrum will also make physical sense. If the Hilbert spectrum is a function of time, the index will not be zero, then the Fourier spectrum will cease to make physical sense. The higher the index value, the more nonstationary is the process. As the index shows, the data are highly nonstationary especially for the high frequency components.

Eq. (4') defines the stationarity as a function of frequency. This is necessary, for certain frequency components can be nonstationary while other components still remain stationary. An example is the sporadic riding wind waves on otherwise uniform swell: The low frequency swell component is stationary, while the high frequency wind waves are intermittent, and hence nonstationary.

The degree of stationarity is also implicitly a function of time, for the definition depends on the time length of integration in Eqs. (3') and (4'). Therefore, a process can be piecewise stationary. To delineate the time dependent property, the degree of nonlinearity should be compute on sliding windows as in the case of the time dependent correlation studied by Chen et al (2011). On the other hand, for a singular outburst in an otherwise stationary signal, the process can be regarded as almost stationary if we take a long time integral, but nonstationary if we look at the immediate neighborhood of the outburst. Stationarity can be a complicated property of the process: For any data shorter than a typical long wave period, the process may look transient. But as the data length gets longer, the process can have many of the longer wave periods and becomes stationary. On the other hand, the data can be locally stationary while in a long time sense nonstationary. A time dependent index of nonlinearity is therefore not only useful but also necessary to quantify to the process and give a measure of the stationarity.

The degree of stationarity defined in Eq. (4') can be modified slightly to include the statistically stationary signals, for which the Degree of Statistic Stationarity, DSS(ω, ΔT), is defined as $$DSS(\omega, \Delta T) = \frac{1}{T}\int_0^T \left[1 - \frac{\overline{H(\omega, t)}}{n(\omega)}\right]^2 dt \qquad (5')$$

where the over line indicates averaging over a definite but shorter time span, ΔT, than the overall time duration of the data, T. For periodic motions, the ΔT can be the period. Such a time scale, however, is hard to define precisely for high dimensional, nonstationary dynamic systems. Even with this difficulty, the definition for DSS could be more useful in characterizing random variables from natural phenomena. Obviously, DSS will depend on both frequency and the averaging time span.

The above definition has been published and patented by Huang et al (1998) and Huang (1999, U.S. Pat. No. 5,983,162). In light of this nonlinearity patent, this definition is no longer tenable, the Hilbert spectrum used in the above definition contains the contribution from nonlinearity. To correct this fault, a new definition is given below:

The frequency used in the Hilbert spectrum should be the value from the modified zero-crossing method defined, for the whole wave,' in this patent. In this way, we can eliminate the contribution from the nonlinearity.

The degree of nonstationary is then defined as $$DS(\Delta T) = std\left[\frac{H(\omega, t) - \langle H(\omega, t)\rangle_{\Delta T}}{\langle H(\omega, t)\rangle_{\Delta T}}\right] \qquad (6')$$

$$= std\left[\frac{H(\omega, t)}{\langle H(\omega, t)\rangle_{\Delta T}} - 1\right]$$

Within the window length of ΔT. When the ΔT approach the total data length T, the degree of nonstationarity is for the whole data set. Otherwise, the degree of nonstationary is for the local window. The definition given here is non-dimensional; therefore, it would give a more objective answer than the one is given in Huang (1999).

Calibration of the Degree of Nonlinearity

Having defined the DN, we will calibrate the definition through a series of low dimensional dynamic systems that including Stokes, Duffing, Rossler and Lorenz equations.

Stokes Model

The Stokes model we adopted is given by the following controlling equation:

$$\frac{d^2x}{dt^2} + x + \varepsilon x^2 = \gamma\cos\omega t \qquad (13)$$

For this study, we have fixed the value of ω at 2π/25 radian/sec and γ=0.1. They are two type of Stokes model studied here. Type 1 is with ϵ positive and type 2 with ϵ negative. Because of the equation type, there are limits on the ϵ values one can assign. For type 1, the limit is 0 to 0.375; for type 2, the limit is 0 to 0.391. Beyond these limits, the equation will admit no periodic solution. In fact, as one approaches these limits, the solutions would be chaotic already.

Figure 3A:
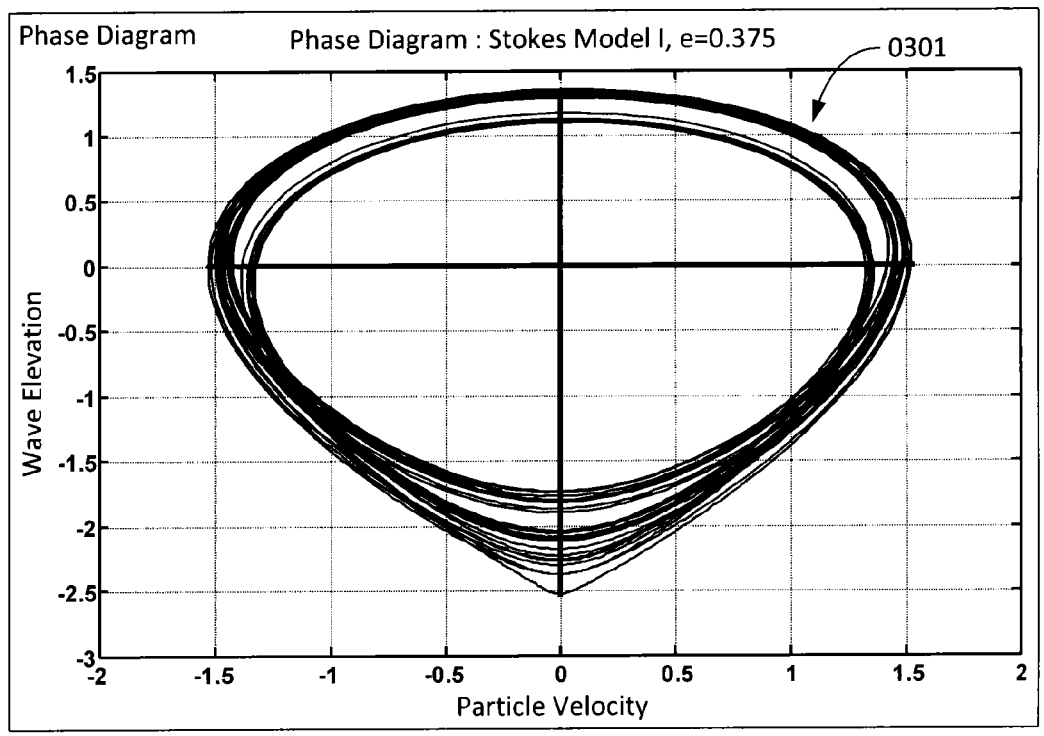
FIG. 3A shows the phase diagram for Stokes model 1 according to one embodiment of the present invention, as given in Equation (13), with $\epsilon$ positive at 0.375.
Figure 3B:
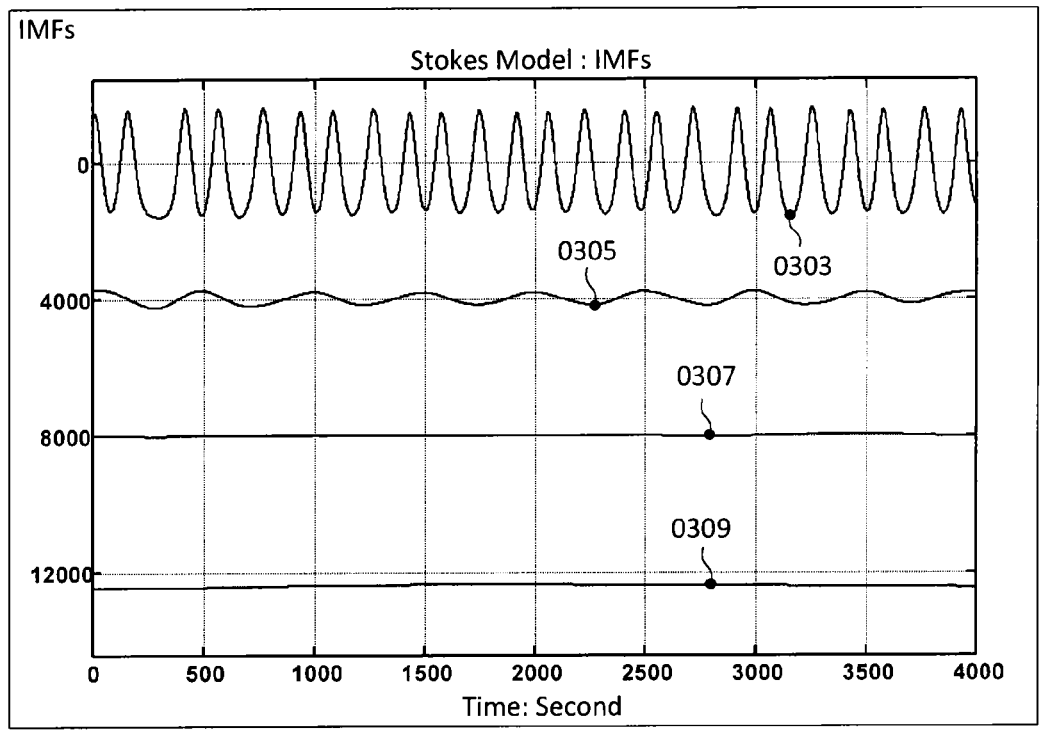
FIG. 3B shows the IMFs for the wave modeled data corresponding to the phase diagram given in FIG. 3A according to one embodiment of the present invention.
Figure 3C:
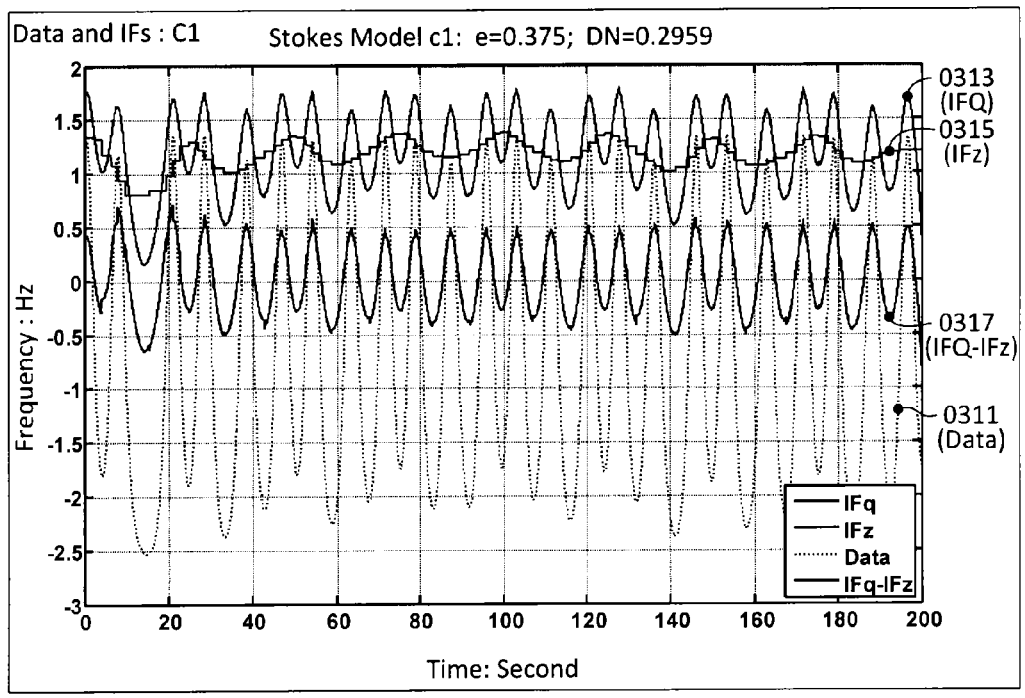
FIG. 3C shows the wave profile, instantaneous frequency values determined by direct quadrature, the zero-crossing and their difference for IMF1 of the Stokes 1 model according to one embodiment of the present invention, notice the 1 to 1 intra-wave frequency modulation pattern.
Figure 3D:
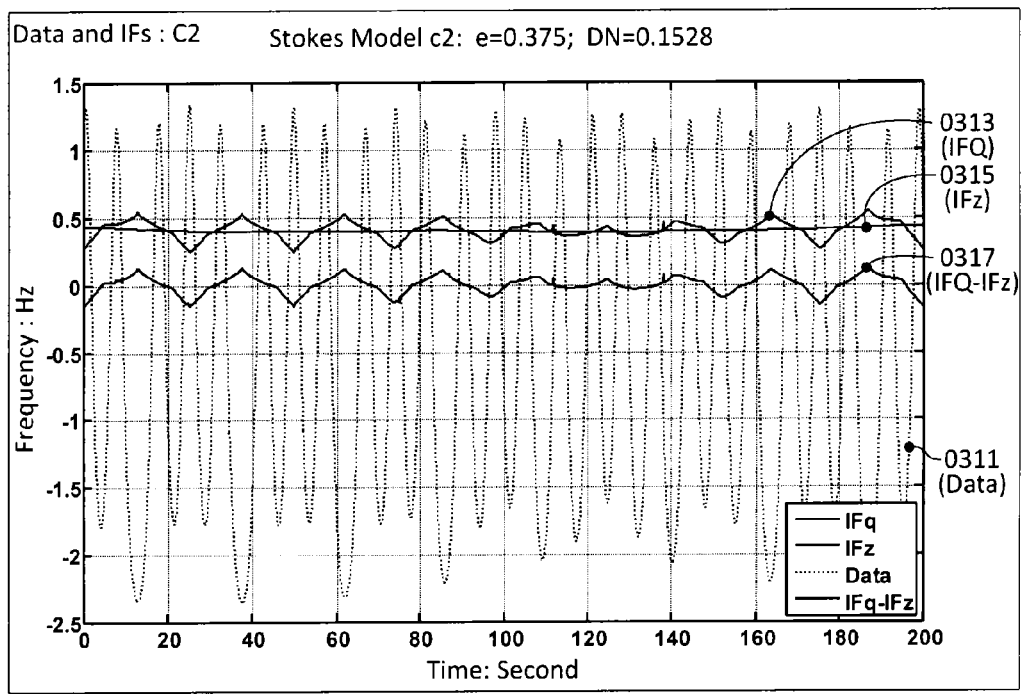
FIG. 3D shows the wave profile, instantaneous frequency values determined by direct quadrature, the zero-crossing and their difference for IMF2 of the Stokes 1 model according to one embodiment of the present invention, notice the 3 to 1 intra-wave frequency modulation pattern.
Figure 3E:
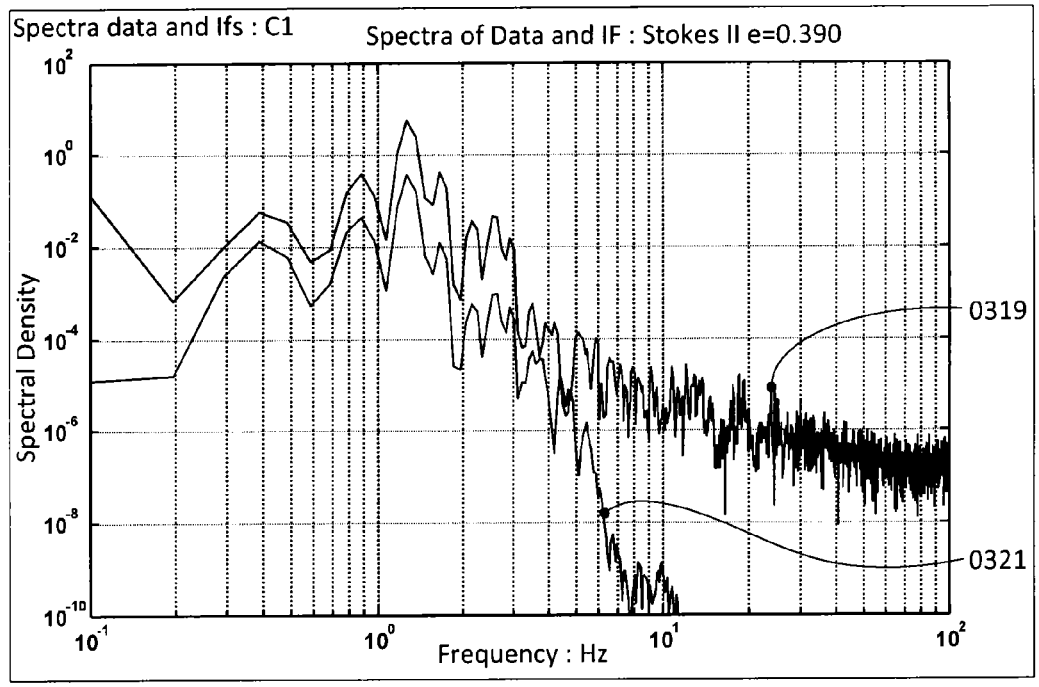
FIG. 3E shows the Fourier spectra for the wave data and the instantaneous frequency values for IMF1 according to one embodiment of the present invention; the peak values of the spectra also show 1 to 1 ratio.
Figure 3F:
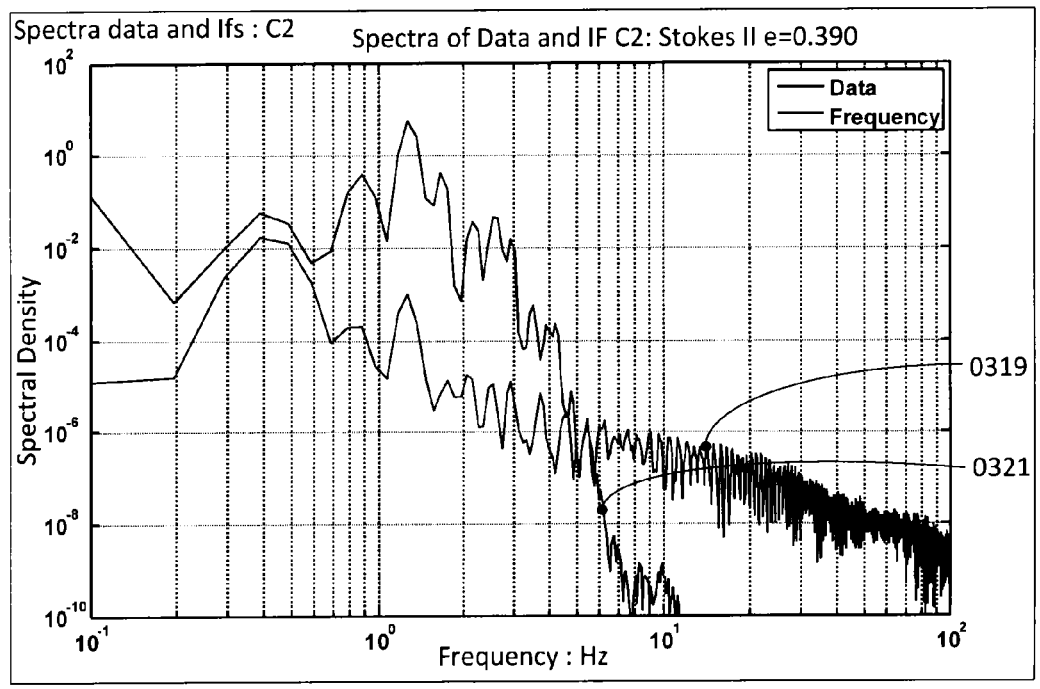
FIG. 3F shows the Fourier spectra for the wave data and the instantaneous frequency values for IMF according to one embodiment of the present invention; the peak values of the spectra also show 3 to 1 ratio.

Let us examine the solution for type 1 Stokes model with ϵ=0.375. The phase plot is given in FIG. 3A with a prominent up-down asymmetry as the differential equation indicated. The trajectory 0301 has clearly shown the chaotic nature of the motion, for the locus of the motion is no longer strictly periodic. When the signal is decomposed with EMD, we have the IMF components 0303/0305/0307/0309 given in FIG. 3B. The first dominant component 0303 is asymmetric and it contains the overwhelming portion of the total energy. Following the definition of DN and CDN, we have the DN for IMF 1 and 2 given in FIG. 3C and FIG. 3D respectively. In these Figs, we present the data 0311, the IF (instantaneous frequency) 0313 and IFz (zero-crossing mean instantaneous frequency) 0315 and the deviation 0317 of IF from IFz. One can see clearly that the IFz 0315 have a much more limited fluctuating. The values are depicted by a step-function because the definition of IFz 0315 would only admit a mean value over the whole wave as the mean frequency of 1/period, with the period defined as the similar phase point completing a cycle. With both IF 0313 and IFz 0315 given, the difference between them and the local amplitude would give the DN readily. For IMF 1, we have DN=0.2959; for IMF 2, we have DN=0.1928. As IMF 1 has the dominant portion of energy, the combined degree of nonlinearity is almost no different from that of IMF1. As discussed above, we can compute the parameter n from the frequency of the intra-wave modulation. Since this is a relative simple case and its result depends only on the mean value of frequency, we could even use the Fourier spectral representations using the peak values only. The spectra for IF is the curve labeled as 0319, and the spectra for IF 1 and IF 2 is the curve labeled as 0321 given in FIG. 3E and FIG. 3F Clearly, for IMF 1, the modulation pattern is once per each oscillation cycle; therefore, n=1, a conclusion we could readily deduce from the instantaneous frequency fluctuation given in FIG. 3C. This reveals that the controlling equation should have a quadratic nonlinear term, a value agrees with the model equation given here perfectly. For IMF 2, however, the modulation pattern is very different; it is thrice per cycle, as also indicated by the Fourier spectral analysis result. This indicates that the Stokes model given here has a much more subtle complication than the simple form given by Equation (5) could accommodate exactly. As the energy density in IMF 2 is low, this modulation pattern is not a determinant of the over all nonlinear property of the controlling equation. It only serves to remind us that the solution of even such a simple nonlinearity is elusive. The simple form given in Equation (5), however, had captured the main characteristics of the controlling differential equation quantitatively.

Figure 3G:
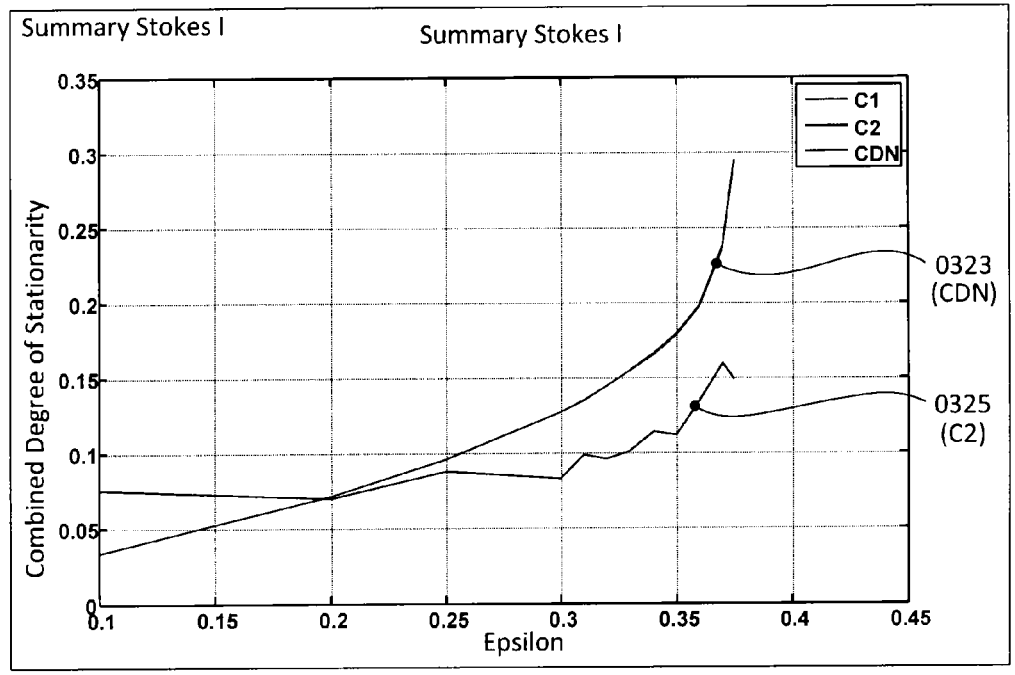
FIG. 3G shows the summary of all the degree of nonlinearity of values for Stokes 1 Model according to one embodiment of the present invention, in which the CDN and DN for IMF1 are almost identical, and the DN values for IMF2 are somewhat erratic due to computation stability.

When we change the ϵ value over the possible range, we obtained the values of the degree of nonlinearity changing gradually and smoothly till the value is near the limit of Epsilon ϵ=0.375, when it increases drastically as shown in FIG. 3G. Here the values of CDN and the DN (C1) of the first IMF are almost exactly on top of each other, labeled as 0323. The values of DN for IMF 2 are much lower because of low energy intensity and the variation somewhat irregular. The reason for irregular change always happens in the higher IMF components, especially when their energy intensity is low, could be from the computation precision and stability. It could also due to the piecewise cubic spline used in the decomposition procedure. Although the cubic spline guarantees the continuity in first and second derivatives of the data, it might not guarantee the smoothness in the phase function, from which the instantaneous frequency is derived.

Figure 3H:
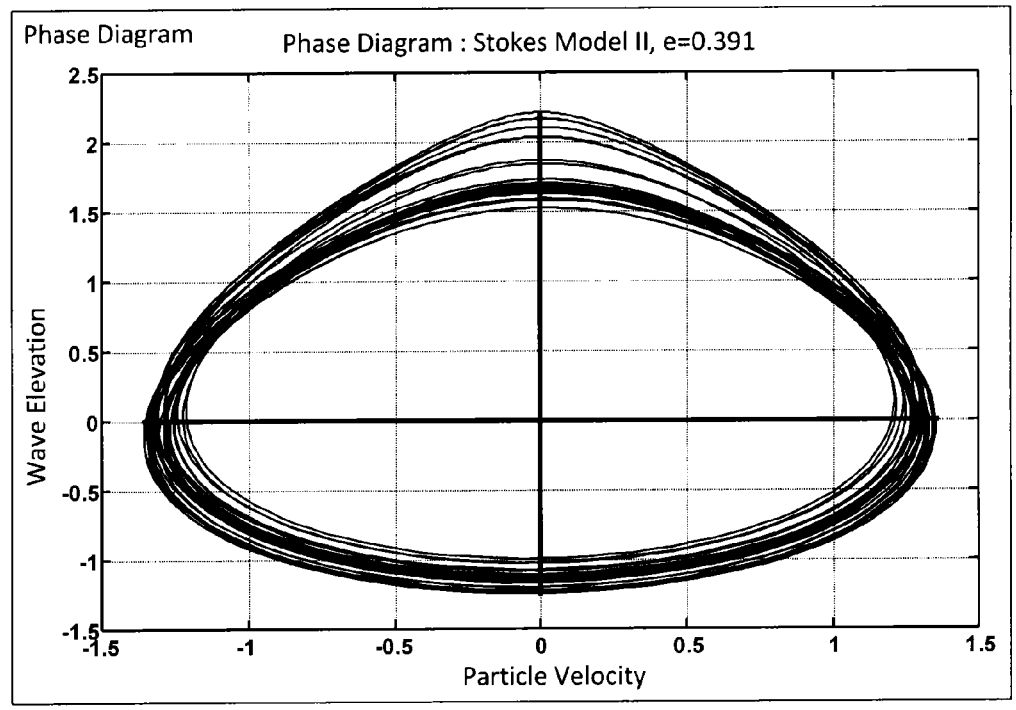
FIG. 3H shows the phase diagram for Stokes 2 model, as given in Equation (13), with $\epsilon$ negative at 0.391 according to one embodiment of the present invention.
Figure 3I:
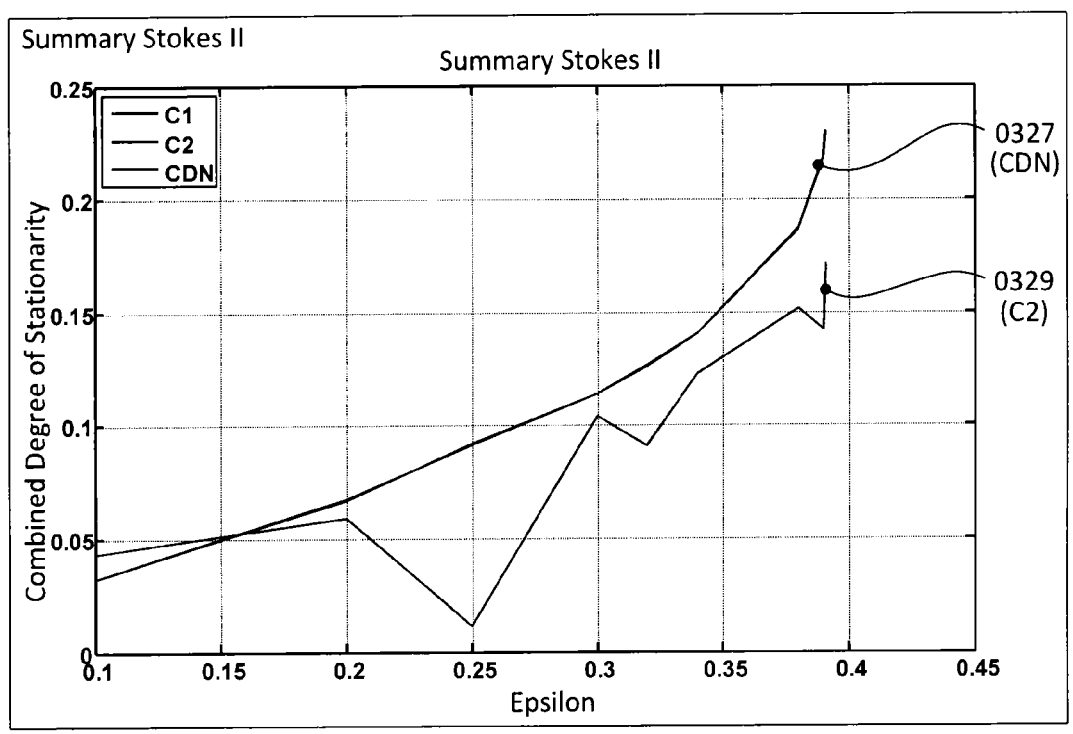
FIG. 3I shows the summary of all the Degree of nonlinearity values for Stokes 2 Model according to one embodiment of the present invention, in which the CDN and DN for IMF1 are almost identical, and the DN values for IMF2 are somewhat erratic due to computation stability.

When we change the ϵ value to negative, the oscillation pattern will change accordingly as shown in phase plane in FIG. 3H: Here the crests are sharper and the troughs round off. For epsilon ϵ=−0.391, the DN is comparable to the positive case. After trying many different ϵ values, we can summarize the over all nonlinear properties of the Stokes model in FIG. 3I. The degree of nonlinearity increases gradually with increasing ϵ till the value of ϵ approaches their limits between 0.35 and 0.40. As in both cases the first IMF dominates in energy density, the CDN 0327 and DN for IMF 1 are almost identical, both labeled as 0327. The irregularity of its values for the second IMF most likely comes from the computational precision and stability again. Their general trends, however, are clear: the degree of nonlinearity increase with the values of the parameter ϵ when n is fixed.

Duffing Model

The standard Duffing model is given by:

$$\frac{d^2 x}{dt^2} + \alpha \frac{dx}{dt} + \beta x + \varepsilon x^3 = \gamma \cos \omega t \qquad (14)$$

This classic equation has been studied extensively (see, for example, Ueda, 1980 and Drazin, 1992), for its simplicity in form and complicity in the dynamics represented. Its solution covers from regular oscillation to chaos. For those interested in the equation itself, they can consult the numerous books. We are here only interested in using it to illustrate the validity of obtaining the degree of nonlinearity through the particular method proposed here; therefore, without lost of generality, we decided to study the un-damped system with α=0. Even with this simplification, we have to study the following three different cases:

$d1: \beta=1$ and $\epsilon>0$.

$d2: \beta=1$ and $\epsilon<0$.

$d0: \beta=-1$ and $\epsilon>0$.

Of these three cases, d1 will admit oscillatory solution for any value of ϵ; d2 will only admit oscillatory solution for a very narrow range of ϵ values. The most interesting case is d0, the Duffing equation with negative stiffness. We will illustrate the results with two cases for ϵ=1.00 and 0.50.

Let us start with the case d1. For ϵ=0.5, we have the results given in FIG. 4A, FIG. 4B, FIG. 4C. The phase diagram given in FIG. 4A, we can see the motion is nearly regular and periodic, but not strictly so, for the locus 0401 is not a single line. The data 0407 plotted in FIG. 4B also shows the undulation of the near constant amplitude sitting on top of a lower frequency component. Nevertheless, the mean frequency 0405 is almost a constant line as shown in FIG. 4B and the instantaneous frequency 0403 as well as the deviation 0409 are also shown in FIG. 4B. After explored the full range of ϵ values, it becomes clear that for d1 case, ϵ could be any almost arbitrary large, the equation still yields near regular oscillatory solution. The degree of nonlinearity values of all the resulting motions are all pretty low lying below 0.1 as shown in FIG. 4C, where the values of DN and CDN 0411 are almost identical, in which the D1CDN 0411 is the combination of the IMF 1~IMF4. In FIG. 4C, the curve D1CDN (0411) represents both the IMF1 and the combination, the curve $d1c2$ (0413) corresponds to IMF2, the curve $d1c3$ (0415) corresponds to IMF3, and the curve $d1c4$ (0419) corresponds to IMF4.

The most interesting result here is that the CDN and DN values are not changing monotonically with ϵ values: they increase at the beginning but eventually decrease with increasing ϵ values, indicating for the first time that ϵ values by itself might not be a good indicator for the degree of nonlinearity. Though the DN values of all the higher IMFs are somewhat higher and erratic, but their contributions to the CDN are almost negligible. Again, the erratic behavior of the higher IMFs could be due to the computational instability and the spline fitting approximation.

Next, we will examine the case d2. The change in the sign of ϵ has drastically changed the characteristic of the solution. For the case of Epsilon ϵ=0.2, the undulation of the wave amplitude becomes much larger as shown in FIG. 5A. Although the waveform is still sharp crest and trough, the mean frequency values are fluctuating now. The most drastic change is the limited range of ϵ values. Here when ϵ is slight beyond 0.2, the equation would not yield any oscillatory solution as shown in FIG. 5B. In FIG. 5B, $d2c2$ (curve 0511) corresponds to IMF; $d2c1$ (corresponding to IMF1) and CDN are almost identical and shown as curve 0509. In both the d1 and d2 cases, the ratios of intra-wave frequency modulation 0503 to the data wave frequency 0501 are 2:1 indicating the controlling differential equation should have a cubic nonlinearity in agreement with the model equation given in Equation (14), and the instantaneous frequencies 0505 as well as the mean frequency 0507 are also shown in FIG. 5A.

Now, let us examine the most interesting case of d0. This is known as the Duffing equation with negative stiffness. The solution to this equation is highly variable. The case for ϵ=1.00 has been studied by Huang et al (1998); it is already chaotic, but the oscillation is almost quasi-periodic as shown by the phase diagram in FIG. 6A, where the orbits 0601 of the system is highly deformed from the regular circle, the orbits 0601 are nearly periodic, but they will never repeat. The IMF for the data is shown in FIG. 6B, which shows a dominant component in energy density for IMF 1. The data 0613, the intra-wave frequency modulation 0615 determined in the two different ways are given in FIG. 6C, and the instantaneous frequency 0619 as well as the mean frequency 0617 are also shown there. Here the DN for IMF is 0.4162 and the CDN is 0.4142, for the first IMF dominates in the energy density. The Fourier spectral representations for the data 621 and the instantaneous frequency 0623 are given in FIG. 6D, which clearly shows that the intra-wave frequency modulation is 2 to 1. In this case, the wave form would be with sharp crests and troughs and the controlling equation should have cubic nonlinear term.

The case for ϵ=0.50 is much more complicate; it is not only chaotic with butterfly pattern suggesting possible two attractors. The oscillations also become non-periodic as shown by the phase diagram in FIG. 7A, which shows the orbits 0701 tracing a butterfly pattern. The IMFs 0703/0705/0707/0709/0711 for the data is shown in FIG. 7B, indicating more than one dominant components in energy density. In fact, due to the switches back and forth in the butterfly patterns, the second IMF 0705 contains more energy than the first IMF 0703 here. The data 0719 and the instantaneous frequencies variation 0717 are given in FIG. 7C. Here the DNs for first two IMFs are 0.5448 and 0.3032 respectively. This combination gives the CDN at 0.4558. The Fourier spectral representations for the data and instantaneous frequency are given in FIG. 7D, which shows broadband peaks for both the data and the IFs with a ratio of only 1.5 to 1 ratio. In this case, because of the butterfly pattern, the Fourier spectral representation for the intra-wave modulation no longer gives a clear definition of the equivalent power term for the controlling equation. The reason is simply that the data and the IF are no longer linear and stationary. The cubic properties, however, could still be inferred from the instantaneous frequency plot given in FIG. 7C, in which the modulation peaks of the IF lined up perfect with each crest and trough of the data suggesting again a ration of 2:1. Therefore, the controlling equation still should have a cubic nonlinear term.

Interestingly, we found that the chaotic condition only appears for small ϵ values. As shown in the summary chart given in FIG. 8, where one can see that the DN variation is quite erratic fluctuating wildly with increasing ϵ values, for the system is already chaotic with phase diagram having butterfly patterns. As the ϵ values approaching unit, the system suddenly behaves more regularly without the butterfly patterns, albeit still chaotic. With this more regular oscillation as shown in FIG. 6, the degree of nonlinearity also decreases with increasing ϵ values.

From these examples, we can see that the state of severe chaotic motion with butterfly pattern phase diagram belongs to a separate category: The degree of nonlinearity is still high for the system component (the first IMF), but CDN could actually decrease due to the second and higher IMFs having more energy but lower degree of nonlinearity. For the chaotic state, the CDN no longer has a smooth and orderly trend of variation. A more interesting result here is that the degree of nonlinearity does not increase with the traditionally identified 'small parameter.' Rather, after the DN and CDN reach a peak value, the DN and CDN values actually decrease and the oscillations becomes more orderly as the ϵ value increases. This observation indicates that using the 'small parameter' to determine the severity of nonlinearity is no longer tenable.

Rossler Model

The Rossler model is a simplification of the Lorenz system. The controlling equation is given as follows:

$$\frac{dx}{dt} = -y - z,$$ (15)

$$\frac{dx}{dt} = x + ay,$$

$$\frac{dz}{dt} = b + z(x - c),$$

$$a = b = 0.2;$$

$$c = 1.0, 3.5, 5.7 \text{ and } 8.0.$$

Even though this is a simplified version, there are still three parameters for us to select. It is too complicate and convoluted to study systematically here, for our goal here is limited to illustrate the computation of the degree of nonlinearity for various systems. Therefore, we decide to fix the parameter a and b, and only to vary c. An interesting feature of this system is that there again no small parameter for us to gauge the nonlinearity. Actually, around c=3.5, we would have the classic period doubling result. When c=5.7, the system would become totally chaotic. The case of period doubling has been studied in Huang et al (1998); here we will present the case for c=8.0.

The phase diagram is given in FIG. 9A, which is qualitatively similar to the period doubling case studied in Huang et al (1998). The crucial difference are that the orbits 0901 are not simply period doubling, but with many possible to damped oscillations; and that the orbits 0901 are not repeating themselves. The IMFs 0903/0905/0907/0909, given in FIG. 9B, show a dominant component in IMF1 0903, which give near a quadruple period repetition. The data 0911, the instantaneous frequencies 0915 and the degree of nonlinearity given in FIG. 9C also confirm the quadruple period repetition cycle. The Fourier spectral is representations of the data 0917 and the IF 0919 given in FIG. 9D suggest that there is a 1:1 ratio in the intra-wave frequency modulation. Therefore, the Rossler system could be classified as having an equivalent quadratic controlling equation. This classification is in agreement with the Rossler system before it becomes chaotic, when the Fourier spectrum consists of all integer harmonics and the asymmetric wave form with sharp crests and rounded off troughs similar to the Stokes waves. The quadratic nonlinearity characteristics is reasonable, for the system given in Equation (15) is nonlinear only because of the product term representing motion in z-direction.

It should be pointed out that the Rossler system admit solutions for x and y directions as well. The properties of the other direction is comparable to the z-direction discussed here, therefore; we will not spend more time in this case anymore and decide to examine another more complicated system.

Lorenz Model

The Lorenz model is the most famous nonlinear equation that was derived based on the unstable convective flows. The system is represented by the following coupled equations:

$$\frac{dx}{dt} = \sigma(y - x),$$ (16)

$$\frac{dy}{dt} = x(\rho - z) - y,$$

$$\frac{dz}{dt} = xy - \beta z,$$

with $\sigma$(Pr andt ln umber) = 10;

$\beta = 8/3$;

$\rho$ (Rayleigh number) varying.

The Lorenz system is very complicated; it is the model equation that initiated, and subsequently occupied a unique position in, the chaotic studies. It would be to time consuming for us to study it systematically, for the system depends not only on the parameters values, the results depends critically on the initial values. Fortunately, the systematic study of the Lorenz system is not the purpose, for those who are more interested in the system behavior should consult on of those numerous books on nonlinear and chaos systems (for example, Drazin, 1992). Here, we will concentrate on quantifying its degree of nonlinearity. For this purpose, we decide to study the classic case of the butterfly wing pattern given above, with ρ=28.

The phase diagram is given in FIG. 10, which shows a full flanged three dimensional butterfly pattern 1001. Now we will study each of the three components as follows:

The x-component: The IMFs are given in FIG. 11A. Here we get an almost quasi-periodic oscillation with only one dominate mode. The IFz 1113, the data 1109, the instantaneous frequency 1111 and the DN are given in FIG. 11B. The pattern of a 1:1 ration in the intra-wave frequency modulation 1115 can be clearly seen. This one to one intra-wave modulation pattern is also confirmed by the Fourier spectral representation of the data 1117 and IF 1119 as given in FIG. 11C. Relatively speaking, the x-component behaves quite regularly, but the sudden jumps in amplitude suggest some drastic changes in the dynamic processes are at working. Furthermore, the instantaneous shows strong intra-wave modulations, a tell sing of strong nonlinearity. The computed DN value is 0.5147, the highest of all the system we studied so far. Because of the more benign higher IMFs, the final combined nonlinearity CDN value is slightly lower at 0.5027. The Hilbert spectrum of the x-component is given in FIG. 11D. The intra-wave modulation is again visible. This intra-wave modulation 1125 gives a broad peak in the marginal spectrum, shown in FIG. 11E. The Fourier spectrum representation 1123 on the other hand has a sharp main energy peak. To accommodate the nonlinearity, the Fourier Spectrum needs a lot of higher harmonics, which could be easily mixed with the noise. Therefore, though the harmonics are a legitimate representation of the nonlinearity mathematically (but not physically), it is still not a practical way for us to measure the degree of nonlinearity through it. The broadened main spectral peak offers a much more robust measure of nonlinearity. Now, let us examine the other components.

The y-component: The IMFs 1201/1203/1205/1207/1209 are given in FIG. 12A. Here we have many energetic IMF components. The data 121, the instantaneous frequencies 1215 and the DN are given in FIG. 12B. As the consequence of the butterfly oscillation pattern, even the instantaneous frequency values 1215 have a wide oscillation patterns, but this fluctuation is captured by the zero-crossing mean frequency 1217, which follows the fluctuation closely. As a result, the highly variable butterfly effect does not materially influence the degree of nonlinearity. This gives the computed value for DN only at 0.4338, slightly lower than the x-component. Due to the more gradual change in frequency of the other more energetic IMFs, the final combined CDN at only at 0.3390. Although the 1:1 IF modulation is clearly discernable here, the highly nonstationary nature of the oscillation had rendered the Fourier spectral representation uninformative as shown in FIG. 12C.

The z-component: The properties of the z-component are very similar to those of the y-component. The IMFs 1315/1317/1319/1321 are given in FIG. 13A. Here again we have many energetic IMF components. The data 1315, the Instantaneous Frequencies 1321 and the DN are given in FIG. 13B. Again as the consequence of the butterfly oscillation pattern, the oscillation patterns are highly variable, which gives a high DN value at 0.4980, and CDN at 0.3370. Although the 1:1 IF modulation is clearly discernable here, the highly nonstationary nature of the oscillation had rendered the Fourier spectral representation 1323 uninformative again, as shown in FIG. 13C.

A Bilinear Oscillator

The bilinear system is based on a conceptual model when the modulus of elasticity is modeled as two sections of straight lines to simulate the transition from elastic deformation to a different plastic stage as reported by Liu (1997). Numerical computation clearly illustrates the vibration of the system would change from a simple oscillation when the load is light. The vibration wave form would change to a nonlinear one when the loading exceeds the elastic limit. The broadening of the spectrum due to the intra-wave modulation would cause the marginal spectrum to broaden as discussed by Huang et al (2005). As a structure failure would have to go through a plastic stage; therefore, the appearance of nonlinear vibration should precede the failure and act as a forewarning of pending collapse. The appearance of the nonlinear vibration is easier to detect than the frequency down-shift caused by damage or yielding. Thus, the detection of nonlinear vibration would be a much more sensitive method for structure health monitoring.

Time-Dependent Degree of Nonlinearity

The above discussed Degree of nonlinearity is based on global mean; therefore, it works only for stationary processes. If the process is nonstationary, one can compute the degree of nonlinearity based on a sliding window of variable size as proposed by Chen et al (2010). The implementation of this computation is straightforward, yet the results have extended the application of the present idea to the fully nonstationary and nonlinear data. One example of the time-dependent study is given in FIG. 14A and FIG. 14B, where the rate of heart beat for Ventricular fibrillation (VF) case is given. The VF signal is generated by multiple interacting systems within heart; it is the most common arrhythmia causing sudden cardiac death. Because of the non-linear dynamics, the VF signals can be viewed as a structure of non-stationary, non-periodic but deterministic series of data. The raw data is decomposed by EMD, and the Degree of nonlinearity 1401 of the most energetic component within a sliding window is computed. The result indicated that the heart beat rate eventually become highly nonlinear at the terminate stage.

Another example of the time dependent degree of nonlinearity is on the NASDAQ data. Again the data is decomposed into IMFs first. The time dependent degree of nonlinearity is computed for all the components. The result is given in FIG. 15, which indicates that the degree of nonlinearity is a variable dependent on the IMF temporal scale. High degree of nonlinearity indicates the instability of the market. Thus the method could be used as an additional indicator for the market fluctuation.

FIG. 16 is a flowchart of the method for obtaining and modeling a degree of nonlinearity of a target signal according to one embodiment of the present invention, in which the method is implemented by an electronic system such as a personal computer or a cloud computing system. The method decomposes is the target signal which is a solution of a controlling differential equation (such as Equation (4)) into at least one intrinsic mode function with Empirical Mode Decomposition (step 1601), obtains an instantaneous frequency of the intrinsic mode function with a direct quadrature method (step 1603) i.e. the inverse trigonometric function, and obtains a mean frequency of the intrinsic mode function within a cycle using a modified generalized zero-crossing method (step 1605). Generalized Zero-Crossing (GZC) is a method of computing the Instantaneous Frequency for a nonlinear and nonstationary signal based on full and partial periods around a data point of the signal. Zero crossing points are points at which a signal under consideration crosses a zero value.

After that, the method acquires a frequency difference between the instantaneous frequency and the mean frequency (step 1607), derives a degree of nonlinearity of the target signal according to the frequency difference and the mean frequency (step 1609).

The degree of nonlinearity can be derived according to a equation $$\left[\left(\frac{IF-IFz}{IFz}\right)^2\right]^{1/2}$$

which is equal to $$\frac{n\varepsilon}{\sqrt{2}},$$

and IF represents instantaneous frequency of the intrinsic mode function, IFz represents the mean frequency of the intrinsic mode function, the parameter n and the parameter $\varepsilon$ represent two quantity constants. In more detail, the parameter n represent the form of the nonlinearity, and the parameter $\varepsilon$ represent the magnitude of the nonlinearity term. The degree of nonlinearity can also derived from the equation $$\left\langle\left[\frac{IF-IFz}{IFz}\right]\times\frac{a_z}{a_z}\right\rangle,$$

where $a_z$ stands for the zero-crossing amplitude of a local whole wave, and $\overline{a_z}$ indicates the mean value. As a result, the power of a nonlinear term in the controlling differential equation (Equation (4)) is n+1 when the frequency of the frequency difference is n times of the frequency of the target signal while n is an integer.

The method can further assigns a relative weight with respect to the amplitude of the target signal to derive the degree of nonlinearity (step 1611). Then a safety margin of a physical structural is determined according to the degree of nonlinearity (step 1613). For example, the health condition of a human being is determined according to the value of the degree of nonlinearity. More specifically, if the defined degree of nonlinearity ranges from 0 to 1, then the health condition of the human being is in danger if the measured degree of nonlinearity exceeds 0.6. In addition, the instability of the stock market is also determined according to the value of the degree of nonlinearity, in which the instability increases as the value of the degree of nonlinearity increases.

Finally, the method presents the degree of nonlinearity to a human being (step 1615), in which the degree of nonlinearity is presented to the human being through a monitor displaying a waveform of the degree of nonlinearity or through a log file with the written degree of nonlinearity.

FIG. 17 is a flowchart of a method for obtaining and modeling a combined degree of nonlinearity of a target signal, in which the method is implemented by an electronic system such as a personal computer or a cloud computing system. The method decomposes the target signal into a lot of intrinsic mode function with Empirical Mode Decomposition (step 1701), obtains an instantaneous frequency of each intrinsic mode function with a direct quadrature method (step 1703), obtaining a mean frequency of each intrinsic mode function within a cycle using a modified generalized zero-crossing method (step 1705); and acquires a lot of frequency difference between the instantaneous frequencies and the mean frequencies (step 1707).

After that, the method derives a lot of degree of nonlinearity according to the frequency differences and the mean frequencies (step 1709), obtains a combined degree of nonlinearity by weighting the degree of nonlinearity with corresponding energies (step 1711); in fact, the intrinsic mode functions C and the combined degree of nonlinearity CDN are represented as:

$$x(t) = \sum_{j=1}^{N} C_j;$$

$$CDN = \sum_{j=1}^{N} DN_j \frac{C_j^2}{\sum_{k=1}^{N} C_k^2},$$

where x(t) represents the target signal, $DN_j$ represents the degree of nonlinearity of the corresponding intrinsic mode function, and $C_k^2$ represents the energy of the corresponding intrinsic mode function.

After that, the presents the combined degree of nonlinearity CDN is presented to a human being (1713).

FIG. 18 is a flowchart of a method implemented by an electronic system for obtaining and modeling a degree of nonlinearity of a non-stationary target signal. The method decomposes the non-stationary target signal into at least one intrinsic mode function within a time window (step 1801) and obtains the instantaneous frequency and the mean frequency of the intrinsic mode function (step 1803).

After that, the method continues to acquire a frequency difference between the instantaneous frequency and the mean frequency (step 1805), derives a degree of nonlinearity of the non-stationary target signal according to the frequency difference and the mean frequency (step 1807). In addition, the method further slides the time window (step 1809) and repeats steps (1801) to (1807) to derive another degree of nonlinearity. Particularly, the degree of nonlinearity are defined as a function of time (1811) and presented to a human being (1813).

FIG. 19 is a flowchart of a method for quantifying and modeling a degree of nonstationarity. The method, implemented by an electronic system, obtains an instantaneous Hilbert spectrum $H(\omega, t)$ (step 1901), obtains a mean Hilbert spectrum $<H(\omega, t)>_{\Delta T}$ corresponding to a time window (step 1903), derives a normalization according to the instantaneous Hilbert spectrum $H(\omega, t)$ and the mean Hilbert spectrum $<H(\omega, t))$, t)$>_{\Delta T}$ (step 1905), derive a deviation from the normalization (step 1907), obtains a degree of nonstationarity corresponding to the deviation (step 1909), and presents the degree of nonstationarity to a human being (step 1911).

CONCLUSIONS

As nonlinearity has been a qualitative definition, the term, and the even the concept of, nonlinearity had been used loosely to describe any unexplainable anomalies. In fact, without a proper measure to quantify the to degree of nonlinearity discussion of nonlinear effects would be difficult, if not impossible. All the difficulties could be traced to the system based definition of nonlinearity: Unfortunately, the definition is not directly on nonlinearity, but on the complement of linearity.

Traditionally, some attempt to quantify nonlinearity had been used. Mostly, this is based on the magnitude of the 'small' parameters for the nonlinear terms of the controlling differential equations, if they exist. The cases we studied here demonstrated that the magnitude of the parameter nonlinearity term is neither a definitive nor a reliable marker for nonlinearity as in the Duffing equation with negative stiffness. There the chaotic butterfly pattern actually occurs when the small parameter is less than unit. Furthermore, we have found that in order to quantify the degree of nonlinearity, we should give up the system based approach. First, the system approach could only be used to identify linear system. The nonlinear system is defined as 'what is not' linear. This definition is too broad and loose to be quantified to begin with. Secondly, there is also the difficulty of identifying the inputs and outputs in system. Even if we do have the system clearly defined, the same identical system still could have total different nonlinear effects depending on the initial condition as in the autonomous systems. Therefore, the degree of nonlinearity should be related to a state dynamically rather than a system statically.

Based on this train of thoughts, we have identified the intra-wave frequency modulation as an indicator for nonlinearity (Huang et al 1998). In the past, this intra-wave frequency modulation could only be represented by the spurious harmonics, a mathematical artifact in the traditional Fourier analysis. Now we have used this intra-wave frequency modulation to define a degree of nonlinearity, based on the observed data, which enable us to quantify the nonlinearity even if the controlling equation is not available, and/or the inputs and outputs are hard to define.

A more strong justification for using the data to define the degree of nonlinearity is the fact that in most applications in social, natural sciences and engineering problems, the control equations may not be available. This is true when the system is extremely complicated, when the nonlinearity could be a more severe problem. With the present definition, we need only the outputs or the observed data. The computed degree of nonlinearity not only gives a quantitative measure of the nonlinearity, but also reveals some fundamental dynamic properties of the controlling equations. For example, we could determine the power of the nonlinearity as quadratic or cubic in an equivalent oscillator, for simple systems. Here we have demonstrated the validity of this approach through many nonlinear differential equations.

Another important application of the quantified degree of nonlinearity is in health monitoring, which could be applied to structural health monitoring and even in biomedical applications, in which the DN could be used to quantify the damage and safety of the structure, health and pathological condition of a living body in question. But this would be an entire different subject and will be discussed in separate papers.

It will be apparent to those skilled in the art that various modifications and variations can be made to the structure of the present invention without departing from the scope or spirit of the invention. In view of the foregoing, it is to intended that the present invention cover modifications and variations of this invention provided they fall within the scope of the following claims and their equivalents.

What is claimed is:

1. A method of monitoring and control of physical processes of dynamical systems including quantifying and modeling a degree of nonlinearity, the method, comprising: decomposing, implemented by the electronic system, a target signal representing a physical process into at least one intrinsic mode function with Empirical Mode Decomposition; obtaining, implemented by the electronic system, an instantaneous frequency of the intrinsic mode function with a direct quadrature method; obtaining, implemented by the electronic system, a mean frequency of the intrinsic mode function within a cycle using a modified generalized zero-crossing method; acquiring, implemented by the electronic system, a frequency difference between the instantaneous frequency and the mean frequency; deriving, implemented by the electronic system, a degree of nonlinearity of the target signal according to the frequency difference and the mean frequency; and presenting, implemented by the electronic system, the degree of nonlinearity to a human being through a monitor displaying a waveform or a written form of the degree of nonlinearity; and modifying a waveform of the target signal based on the degree of nonlinearity.

2. The method of monitoring and control of physical processes of dynamical systems including quantifying and modeling the degree of nonlinearity as claimed in claim 1, wherein the target signal is a solution of a controlling differential equation.

3. The method of monitoring and control of physical processes of dynamical systems including quantifying and modeling the degree of nonlinearity as claimed in claim 2, wherein the power of a nonlinear term in the controlling differential equation is n+1 when the frequency of the frequency difference is n times of the frequency of the target signal, in which n is an integer.

4. The method of monitoring and control of physical processes of dynamical systems including quantifying and modeling the degree of nonlinearity as claimed in claim 1, wherein the degree of nonlinearity is derived according to an equation $$\left[\left(\frac{IF - IFz}{IFz}\right)^2\right]^{1/2}$$

that is equal to $$\frac{n\varepsilon}{\sqrt{2}},$$

in which IF represents instantaneous frequency of the intrinsic mode function, IFz represents the mean frequency of the intrinsic mode function, and the parameter n, the parameter E represent two quantity constants.

5. The method of monitoring and control of physical processes of dynamical systems including quantifying and modeling the degree of nonlinearity as claimed in claim 4, wherein the parameter n represent the characteristic of the nonlinearity, and the parameter $\varepsilon$ represent the magnitude of the nonlinearity term in a controlling differential equation.

6. The method of monitoring and control of physical processes of dynamical systems including quantifying and modeling the degree of nonlinearity as claimed in claim 1, further comprising assigning a relative weight with respect to the amplitude of the target signal to derive the degree of nonlinearity.

7. The method of monitoring and control of physical processes of dynamical systems including for quantifying and modeling the degree of nonlinearity as claimed in claim 6, wherein the degree of nonlinearity is derived from the equation $$\text{std}\left(\left[\frac{IF - IFz}{IFz}\right] \times \frac{a_z}{\overline{a_z}}\right),$$

where $a_z$ stands for the zero-crossing amplitude of a local whole wave, $\overline{a_z}$ stand for the mean value, and std stands for the standard deviation.

8. The method of monitoring and control of physical processes of dynamical systems including quantifying and modeling the degree of nonlinearity as claimed in claim 1, wherein the degree of nonlinearity is presented to the human being through a log file with the degree of nonlinearity in the written form.

9. The method of monitoring and control of physical processes of dynamical systems including quantifying and modeling the degree of nonlinearity as claimed in claim 1, further comprising determining a safety margin of a physical structural according to the degree of nonlinearity.

10. The method of monitoring and control of physical processes of dynamical systems including quantifying and modeling the degree of nonlinearity as claimed in claim 1, further comprising determining a health condition of a human being according to the value of the degree of nonlinearity.

11. The method of monitoring and control of physical processes of dynamical systems including quantifying and modeling the degree of nonlinearity as claimed in claim 1, further comprising determining an instability of a stock market according to the value of the degree of nonlinearity, wherein the instability increases as the value of the degree of nonlinearity increases.

12. A method of monitoring and control of physical processes of dynamical systems including quantifying and modeling a combined degree of nonlinearity, the method, comprising: decomposing, implemented by the electronic system, a target signal representing a physical process into a plurality of intrinsic mode functions with an Empirical Mode Decomposition; obtaining, implemented by the electronic system, an instantaneous frequency of each intrinsic mode function with a direct quadrature method; obtaining, implemented by the electronic system, a mean frequency of each intrinsic mode function within a cycle using a modified generalized zero-crossing method; acquiring, implemented by the electronic system, a plurality of frequency differences between the instantaneous frequencies and the mean frequencies; deriving, implemented by the electronic system, a plurality of degree of nonlinearity according to the frequency differences and the mean frequencies; obtaining, implemented by the electronic system, a combined degree of nonlinearity by weighting the degree of nonlinearity with corresponding energies; and presenting the combined degree of nonlinearity to a human being; and modifying a waveform of the target signal based on the degree of nonlinearity.

13. The method of monitoring and control of physical processes of dynamical systems including quantifying and modeling the degree of nonlinearity as claimed in claim 12, wherein the target signal is a solution of a controlling differential equation.

14. The method of monitoring and control of physical processes of dynamical systems including quantifying and modeling the degree of nonlinearity as claimed in claim 12, wherein the intrinsic mode functions $C_j$ and the combined degree of nonlinearity CDN are related as:

$$x(t) = \sum_{j=1}^{N} C_j;$$

$$CDN = \sum_{j=1}^{N} DN_j \frac{C_j^2}{\sum_{k=1}^{N} C_k^2},$$

where x(t) represents the target signal, $DN_j$ represents the degree of nonlinearity of the corresponding intrinsic mode function, and $C_k^2$ represents the energy of the corresponding intrinsic mode function.

15. The method of monitoring and control of physical processes of dynamical systems including quantifying and modeling the degree of nonlinearity as claimed in claim 12, wherein the degree of nonlinearity is presented to the human being through a log file with the written degree of nonlinearity.

16. The method of monitoring and control of physical processes of dynamical systems including quantifying and modeling the degree of nonlinearity as claimed in claim 12, further comprising determining a safety margin of a physical structural according to the value of the combined degree of nonlinearity.

17. The method of monitoring and control of physical processes of dynamical systems including quantifying and modeling the degree of nonlinearity as claimed in claim 12, further comprising determining a health condition of a human being according to the value of the combined degree of nonlinearity.

18. The method of monitoring and control of physical processes of dynamical systems including quantifying and modeling the degree of nonlinearity as claimed in claim 12, further comprising determining the instability of the stock market according to the value of the combined degree of nonlinearity, wherein the instability increases as the value of the degree of nonlinearity increases.

19. A method of monitoring and control of physical processes of dynamical systems including quantifying and modeling a degree of nonlinearity, the method, comprising: (a) decomposing, implemented by the electronic system, a non-stationary target signal representing a physical process into at least one intrinsic mode function within a time window; (b) obtaining, implemented by the electronic system, an instantaneous frequency of the intrinsic mode function; (c) obtaining, implemented by the electronic system, a mean frequency of the intrinsic mode function; (d) acquiring, implemented by the electronic system, a frequency difference between the instantaneous frequency and the mean frequency; (e) deriving, implemented by the electronic system, a degree of nonlinearity of the non-stationary target signal according to the frequency difference and the mean frequency; and (f) presenting, implemented by the electronic system, the degree of nonlinearity to a human being through a monitor displaying a waveform or a written form of the degree of nonlinearity; and modifying a waveform of the target signal based on the degree of nonlinearity.

20. The method of monitoring and control of physical processes of dynamical systems including quantifying and modeling the degree of nonlinearity as claimed in claim 19, further comprising: sliding the time window; repeating steps (a) to (d); deriving another degree of nonlinearity of the non-stationary target signal according to the frequency difference and the mean frequency; and defining the degree of nonlinearity as a function of time.

21. A method of monitoring and control of physical processes of dynamical systems including quantifying and modeling a degree of nonstationarity, the method, comprising: obtaining, implemented by the electronic system, an instantaneous Hilbert spectrum; obtaining, implemented by the electronic system, a mean Hilbert spectrum corresponding to a time window; deriving, implemented by the electronic system, a normalization according to the instantaneous Hilbert spectrum and the mean Hilbert spectrum; deriving, implemented by the electronic system, a deviation from the normalization; obtaining, implemented by the electronic system, a degree of nonstationarity corresponding to the deviation; and presenting, implemented by the electronic system, the degree of nonstationarity to a human being through a monitor displaying a waveform or a written form of the degree of nonlinearity; and modifying a waveform of the target signal based on the degree of nonlinearity.

22. The method of monitoring and control of physical processes of dynamical systems including quantifying and modeling the degree of nonstationarity as claimed in claim 21, wherein the degree of nonstationarity is presented to the human being through a log file with the degree of nonstationarity in the written form.

23. The method of monitoring and control of physical processes of dynamical systems including quantifying and modeling the degree of nonstationarity as claimed in claim 22, further comprising determining a safety margin of a physical structural according to the degree of nonstationarity.

24. The method of monitoring and control of physical processes of dynamical systems including quantifying and modeling the degree of nonstationarity as claimed in claim 21, further comprising determining a health condition of a human being according to the value of the degree of nonstationarity.

25. The method of monitoring and control of physical processes of dynamical systems including quantifying and modeling the degree of nonstationarity as claimed in claim

21, further comprising determining an instability of a stock market according to the value of the degree of nonstationarity, wherein the instability increases as the value of the degree of nonstationarity increases.

\* \* \* \* \*